Ű US005755621A

United States Patent [19]
Marks et al.

[11] Patent Number: 5,755,621
[45] Date of Patent: May 26, 1998

[54] MODIFIED POKER CARD/TOURNAMENT GAME AND INTERACTIVE NETWORK COMPUTER SYSTEM FOR IMPLEMENTING SAME

[75] Inventors: Howard M. Marks, Westport, Conn.; Anthony M. Singer, Brooklyn, N.Y.

[73] Assignee: PTT, LLC, Westport, Conn.

[21] Appl. No.: 716,114

[22] Filed: Sep. 19, 1996

Related U.S. Application Data

[60] Provisional application No. 60/019,747, Jun. 14, 1996 and provisional application No. 60/017,432, May 9, 1996.

[51] Int. Cl.$^6$ .............................. G06F 15/44; A63F 1/00
[52] U.S. Cl. ............................ 463/42; 463/11; 463/13; 463/25; 273/292
[58] Field of Search .............................. 463/1, 9–13, 16, 463/25–26, 30–31, 36, 40–42; 364/410–412; 273/292, 293, 274, 138.1, 139, 138.2

[56] References Cited

U.S. PATENT DOCUMENTS

| | | |
|---|---|---|
| 4,743,022 | 5/1988 | Wood . |
| 4,837,728 | 6/1989 | Barrie et al. . |
| 4,856,787 | 8/1989 | Itkis . |
| 4,948,134 | 8/1990 | Suttle et al. . |
| 5,013,049 | 5/1991 | Tomaszewski . |
| 5,078,405 | 1/1992 | Jones et al. . |
| 5,100,137 | 3/1992 | Fulton . |
| 5,118,109 | 6/1992 | Gumina . |
| 5,242,163 | 9/1993 | Fulton . |
| 5,255,915 | 10/1993 | Miller . |
| 5,275,400 | 1/1994 | Weingardt et al. ............ 463/28 |
| 5,294,128 | 3/1994 | Marquez . |
| 5,314,194 | 5/1994 | Wolf . |
| 5,328,189 | 7/1994 | Malek ............................ 273/292 |
| 5,359,510 | 10/1994 | Sabaliauskas ................ 364/410 |
| 5,382,025 | 1/1995 | Sklansky et al. . |
| 5,393,057 | 2/1995 | Marnell, II . |
| 5,393,067 | 2/1995 | Paulsen et al. . |
| 5,407,199 | 4/1995 | Gumina . |
| 5,415,404 | 5/1995 | Joshi et al. . |
| 5,431,407 | 7/1995 | Hofberg et al. . |
| 5,437,451 | 8/1995 | Fulton . |
| 5,451,054 | 9/1995 | Orenstein .................... 273/148 R |
| 5,544,892 | 8/1996 | Breeding ...................... 273/292 |
| 5,584,485 | 12/1996 | Jones et al. . |
| 5,603,502 | 2/1997 | Nakagawa .................... 273/292 |

*Primary Examiner*—Jessica Harrison
*Assistant Examiner*—Mark A. Sager
*Attorney, Agent, or Firm*—Lowe, Price, LeBlanc & Becker

[57] ABSTRACT

A modified poker card game allows a player to sequentially build a card hand after each round of play. The rules of play for the card game including dealing a first pair of cards to the player. The player then selects one of the pair of cards for the card hand, and discards the other card. The player repeats this process until the player has selected a predetermined number of cards that form the card hand. The resulting card hand is then compared to a predetermined winning schedule and/or to other players playing the modified poker game.

29 Claims, 42 Drawing Sheets

| DESCRIPTION | OCCURRENCES | PAYOFF 2 COINS | TOTAL PAYOFF 2 COINS | PAYOFF 4 COINS | TOTAL PAYOFF 4 COINS | PAYOFF 6 COINS | TOTAL PAYOFF 6 COINS |
|---|---|---|---|---|---|---|---|
| JACKS OR BETTER | 21,820,000 | 1 | 21,820,000 | 2 | 43,640,000 | 3 | 65,460,000 |
| TWO PAIR | 12,880,000 | 3 | 38,640,000 | 6 | 77,280,000 | 9 | 115,920,000 |
| THREE OF A KIND | 7,470,000 | 5 | 37,350,000 | 10 | 74,700,000 | 15 | 112,050,000 |
| STRAIGHT | 1,180,000 | 12 | 14,160,000 | 24 | 28,320,000 | 36 | 42,480,000 |
| FLUSH | 1,070,000 | 16 | 17,120,000 | 32 | 34,240,000 | 48 | 51,360,000 |
| FULL HOUSE | 1,150,000 | 20 | 23,000,000 | 40 | 46,000,000 | 60 | 69,000,000 |
| FOUR OF A KIND | 240,000 | 150 | 36,000,000 | 300 | 72,000,000 | 450 | 108,000,000 |
| STRAIGHT FLUSH | 10,000 | 400 | 4,000,000 | 800 | 8,000,000 | 1200 | 12,000,000 |
| ROYAL FLUSH | 2,500 | 1200 | 3,000,000 | 4000 | 10,000,000 | 6000 | 15,000,000 |
| | 45,822,500 | | 195,090,000 | | 394,180,000 | | 591,270,000 |
| | | TOTAL COINS IN | 200,000,000 | TOTAL COINS IN | 400,000,000 | TOTAL COINS IN | 600,000,000 |
| | | HOLD PERCENT | 0.02455 | HOLD PERCENT | 0.01455 | HOLD PERCENT | 0.01455 |

FIG. 4A-1

| DESCRIPTION | OCCURRENCES | PAYOFF 2 COINS | TOTAL PAYOFF 2 COINS | PAYOFF 4 COINS | TOTAL PAYOFF 4 COINS | PAYOFF 6 COINS | TOTAL PAYOFF 6 COINS |
|---|---|---|---|---|---|---|---|
| JACKS OR BETTER | 21,820,000 | 1 | 21,820,000 | 2 | 43,640,000 | 3 | 65,460,000 |
| TWO PAIR | 12,880,000 | 3 | 38,640,000 | 6 | 77,280,000 | 9 | 115,920,000 |
| THREE OF A KIND | 7,470,000 | 5 | 37,350,000 | 10 | 74,700,000 | 15 | 112,050,000 |
| STRAIGHT | 1,180,000 | 10 | 11,800,000 | 20 | 23,600,000 | 30 | 35,400,000 |
| FLUSH | 1,070,000 | 14 | 14,980,000 | 28 | 29,960,000 | 42 | 44,940,000 |
| FULL HOUSE | 1,150,000 | 18 | 20,700,000 | 36 | 41,400,000 | 54 | 62,100,000 |
| FOUR OF A KIND | 240,000 | 150 | 36,000,000 | 300 | 72,000,000 | 450 | 108,000,000 |
| STRAIGHT FLUSH | 10,000 | 400 | 4,000,000 | 800 | 8,000,000 | 1200 | 12,000,000 |
| ROYAL FLUSH | 2,500 | 1200 | 3,000,000 | 4000 | 10,000,000 | 6000 | 15,000,000 |
| | 45,822,500 | | 188,290,000 | | 380,580,000 | | 570,870,000 |
| | | TOTAL COINS IN | 200,000,000 | TOTAL COINS IN | 400,000,000 | TOTAL COINS IN | 600,000,000 |
| | | HOLD PERCENT | 0.05855 | HOLD PERCENT | 0.04855 | HOLD PERCENT | 0.04855 |

FIG. 4A-2

| DESCRIPTION | OCCURRENCES | PAYOFF 2 COINS | TOTAL PAYOFF 2 COINS | PAYOFF 4 COINS | TOTAL PAYOFF 4 COINS | PAYOFF 6 COINS | TOTAL PAYOFF 6 COINS |
|---|---|---|---|---|---|---|---|
| JACKS OR BETTER | 21,820,000 | 1 | 21,820,000 | 2 | 43,640,000 | 3 | 65,460,000 |
| TWO PAIR | 12,880,000 | 3 | 38,640,000 | 6 | 77,280,000 | 9 | 115,920,000 |
| THREE OF A KIND | 7,470,000 | 5 | 37,350,000 | 10 | 74,700,000 | 15 | 112,050,000 |
| STRAIGHT | 1,180,000 | 8 | 9,440,000 | 16 | 18,880,000 | 24 | 28,320,000 |
| FLUSH | 1,070,000 | 12 | 12,840,000 | 24 | 25,680,000 | 36 | 38,520,000 |
| FULL HOUSE | 1,150,000 | 18 | 20,700,000 | 36 | 41,400,000 | 54 | 62,100,000 |
| FOUR OF A KIND | 240,000 | 150 | 36,000,000 | 300 | 72,000,000 | 450 | 108,000,000 |
| STRAIGHT FLUSH | 10,000 | 400 | 4,000,000 | 800 | 8,000,000 | 1200 | 12,000,000 |
| ROYAL FLUSH | 2,500 | 1200 | 3,000,000 | 4000 | 10,000,000 | 6000 | 15,000,000 |
| | 45,822,500 | | 183,790,000 | | 371,580,000 | | 557,370,000 |
| | | TOTAL COINS IN | 200,000,000 | TOTAL COINS IN | 400,000,000 | TOTAL COINS IN | 600,000,000 |
| | | HOLD PERCENT | 0.08105 | HOLD PERCENT | 0.07105 | HOLD PERCENT | 0.07105 |

FIG. 4A-3

| DESCRIPTION | OCCURRENCES | PAYOFF 2 COINS | TOTAL PAYOFF 2 COINS | PAYOFF 4 COINS | TOTAL PAYOFF 4 COINS | PAYOFF 6 COINS | TOTAL PAYOFF 6 COINS |
|---|---|---|---|---|---|---|---|
| JACKS OR BETTER | 21,820,000 | 1 | 21,820,000 | 2 | 43,640,000 | 3 | 65,460,000 |
| TWO PAIR | 12,880,000 | 3 | 38,640,000 | 6 | 77,280,000 | 9 | 115,920,000 |
| THREE OF A KIND | 7,470,000 | 5 | 37,350,000 | 10 | 74,700,000 | 15 | 112,050,000 |
| STRAIGHT | 1,180,000 | 15 | 17,700,000 | 30 | 35,400,000 | 45 | 53,100,000 |
| FLUSH | 1,070,000 | 20 | 21,400,000 | 40 | 42,800,000 | 60 | 64,200,000 |
| FULL HOUSE | 1,150,000 | 30 | 34,500,000 | 60 | 69,000,000 | 90 | 103,500,000 |
| FOUR OF A KIND | 240,000 | 75 | 18,000,000 | 150 | 36,000,000 | 225 | 54,000,000 |
| STRAIGHT FLUSH | 10,000 | 200 | 2,000,000 | 400 | 4,000,000 | 600 | 6,000,000 |
| ROYAL FLUSH | 2,500 | 750 | 1,875,000 | 4000 | 10,000,000 | 6000 | 15,000,000 |
| | 45,822,500 | | 193,285,000 | | 392,820,000 | | 589,230,000 |
| | | TOTAL COINS IN | 200,000,000 | TOTAL COINS IN | 400,000,000 | TOTAL COINS IN | 600,000,000 |
| | | HOLD PERCENT | 0.033575 | HOLD PERCENT | 0.01795 | HOLD PERCENT | 0.01795 |

FIG. 4B-1

| DESCRIPTION | OCCURRENCES | PAYOFF 2 COINS | TOTAL PAYOFF 2 COINS | PAYOFF 4 COINS | TOTAL PAYOFF 4 COINS | PAYOFF 6 COINS | TOTAL PAYOFF 6 COINS |
|---|---|---|---|---|---|---|---|
| JACKS OR BETTER | 21,820,000 | 1 | 21,820,000 | 2 | 43,640,000 | 3 | 65,460,000 |
| TWO PAIR | 12,880,000 | 3 | 38,640,000 | 6 | 77,280,000 | 9 | 115,920,000 |
| THREE OF A KIND | 7,470,000 | 5 | 37,350,000 | 10 | 74,700,000 | 15 | 112,050,000 |
| STRAIGHT | 1,180,000 | 15 | 17,700,000 | 30 | 35,400,000 | 45 | 53,100,000 |
| FLUSH | 1,070,000 | 20 | 21,400,000 | 40 | 42,800,000 | 60 | 64,200,000 |
| FULL HOUSE | 1,150,000 | 25 | 28,750,000 | 50 | 57,500,000 | 75 | 86,250,000 |
| FOUR OF A KIND | 240,000 | 75 | 18,000,000 | 150 | 36,000,000 | 225 | 54,000,000 |
| STRAIGHT FLUSH | 10,000 | 200 | 2,000,000 | 400 | 4,000,000 | 600 | 6,000,000 |
| ROYAL FLUSH | 2,500 | 750 | 1,875,000 | 4000 | 10,000,000 | 6000 | 15,000,000 |
| | 45,822,500 | | 187,535,000 | | 381,320,000 | | 571,980,000 |
| | | TOTAL COINS IN | 200,000,000 | TOTAL COINS IN | 400,000,000 | TOTAL COINS IN | 600,000,000 |
| | | HOLD PERCENT | 0.062325 | HOLD PERCENT | 0.0467 | HOLD PERCENT | 0.0467 |

FIG. 4B-2

| DESCRIPTION | OCCURRENCES | PAYOFF 2 COINS | TOTAL PAYOFF 2 COINS | PAYOFF 4 COINS | TOTAL PAYOFF 4 COINS | PAYOFF 6 COINS | TOTAL PAYOFF 6 COINS |
|---|---|---|---|---|---|---|---|
| JACKS OR BETTER | 21,820,000 | 1 | 21,820,000 | 2 | 43,640,000 | 3 | 65,460,000 |
| TWO PAIR | 12,880,000 | 3 | 38,640,000 | 6 | 77,280,000 | 9 | 115,920,000 |
| THREE OF A KIND | 7,470,000 | 5 | 37,350,000 | 10 | 74,700,000 | 15 | 112,050,000 |
| STRAIGHT | 1,180,000 | 15 | 17,700,000 | 30 | 35,400,000 | 45 | 53,100,000 |
| FLUSH | 1,070,000 | 18 | 19,260,000 | 36 | 38,520,000 | 54 | 57,780,000 |
| FULL HOUSE | 1,150,000 | 21 | 24,150,000 | 42 | 48,300,000 | 63 | 72,450,000 |
| FOUR OF A KIND | 240,000 | 75 | 18,000,000 | 150 | 36,000,000 | 225 | 54,000,000 |
| STRAIGHT FLUSH | 10,000 | 200 | 2,000,000 | 400 | 4,000,000 | 600 | 6,000,000 |
| ROYAL FLUSH | 2,500 | 750 | 1,875,000 | 4000 | 10,000,000 | 6000 | 15,000,000 |
|  | 45,822,500 |  | 180,795,000 |  | 367,840,000 |  | 551,760,000 |
|  |  | TOTAL COINS IN | 200,000,000 | TOTAL COINS IN | 400,000,000 | TOTAL COINS IN | 600,000,000 |
|  |  | HOLD PERCENT | 0.096025 | HOLD PERCENT | 0.0804 | HOLD PERCENT | 0.0804 |

FIG. 4B-3

| DESCRIPTION | OCCURRENCES | PAYOFF 2 COINS | TOTAL PAYOFF 2 COINS | PAYOFF 4 COINS | TOTAL PAYOFF 4 COINS | PAYOFF 6 COINS | TOTAL PAYOFF 6 COINS |
|---|---|---|---|---|---|---|---|
| JACKS OR BETTER | 25,614,000 | 1 | 25,614,000 | 2 | 51,228,000 | 3 | 76,842,000 |
| TWO PAIR | 13,229,000 | 3 | 39,687,000 | 6 | 79,374,000 | 9 | 119,061,000 |
| THREE OF A KIND | 6,441,000 | 5 | 32,205,000 | 10 | 64,410,000 | 15 | 96,615,000 |
| STRAIGHT | 2,312,000 | 10 | 23,120,000 | 20 | 46,240,000 | 30 | 69,360,000 |
| FLUSH | 1,671,000 | 15 | 25,065,000 | 30 | 50,130,000 | 45 | 75,195,000 |
| FULL HOUSE | 1,075,000 | 20 | 21,500,000 | 40 | 43,000,000 | 60 | 64,500,000 |
| FOUR OF A KIND | 180,000 | 100 | 18,000,000 | 200 | 36,000,000 | 300 | 54,000,000 |
| STRAIGHT FLUSH | 26,000 | 300 | 7,800,000 | 600 | 15,600,000 | 900 | 23,400,000 |
| ROYAL FLUSH | 2,100 | 1000 | 2,100,000 | 4000 | 8,400,000 | 6000 | 12,600,000 |
| | 50,550,100 | | 195,091,000 | | 394,382,000 | | 591,573,000 |
| | | TOTAL COINS IN | 200,000,000 | TOTAL COINS IN | 400,000,000 | TOTAL COINS IN | 600,000,000 |
| | | HOLD PERCENT | 0.024545 | HOLD PERCENT | 0.014045 | HOLD PERCENT | 0.014045 |

FIG. 4C-1

| DESCRIPTION | OCCURRENCES | PAYOFF 2 COINS | TOTAL PAYOFF 2 COINS | PAYOFF 4 COINS | TOTAL PAYOFF 4 COINS | PAYOFF 6 COINS | TOTAL PAYOFF 6 COINS |
|---|---|---|---|---|---|---|---|
| JACKS OR BETTER | 25,614,000 | 1 | 25,614,000 | 2 | 51,228,000 | 3 | 76,842,000 |
| TWO PAIR | 13,229,000 | 3 | 39,687,000 | 6 | 79,374,000 | 9 | 119,061,000 |
| THREE OF A KIND | 6,441,000 | 5 | 32,205,000 | 10 | 64,410,000 | 15 | 96,615,000 |
| STRAIGHT | 2,312,000 | 10 | 23,120,000 | 20 | 46,240,000 | 30 | 69,360,000 |
| FLUSH | 1,671,000 | 14 | 23,394,000 | 28 | 46,788,000 | 42 | 70,182,000 |
| FULL HOUSE | 1,075,000 | 18 | 19,350,000 | 36 | 38,700,000 | 54 | 58,050,000 |
| FOUR OF A KIND | 180,000 | 100 | 18,000,000 | 200 | 36,000,000 | 300 | 54,000,000 |
| STRAIGHT FLUSH | 26,000 | 300 | 7,800,000 | 600 | 15,600,000 | 900 | 23,400,000 |
| ROYAL FLUSH | 2,100 | 1000 | 2,100,000 | 4000 | 8,400,000 | 6000 | 12,600,000 |
| | 50,550,100 | | 191,270,000 | | 386,740,000 | | 580,110,000 |
| | | TOTAL COINS IN | 200,000,000 | TOTAL COINS IN | 400,000,000 | TOTAL COINS IN | 600,000,000 |
| | | HOLD PERCENT | 0.04365 | HOLD PERCENT | 0.03315 | HOLD PERCENT | 0.03315 |

FIG. 4C-2

| DESCRIPTION | OCCURRENCES | PAYOFF 2 COINS | TOTAL PAYOFF 2 COINS | PAYOFF 4 COINS | TOTAL PAYOFF 4 COINS | PAYOFF 6 COINS | TOTAL PAYOFF 6 COINS |
|---|---|---|---|---|---|---|---|
| JACKS OR BETTER | 25,614,000 | 1 | 25,614,000 | 2 | 51,228,000 | 3 | 76,842,000 |
| TWO PAIR | 13,229,000 | 3 | 39,687,000 | 6 | 79,374,000 | 9 | 119,061,000 |
| THREE OF A KIND | 6,441,000 | 5 | 32,205,000 | 10 | 64,410,000 | 15 | 96,615,000 |
| STRAIGHT | 2,312,000 | 8 | 18,496,000 | 16 | 36,992,000 | 24 | 55,488,000 |
| FLUSH | 1,671,000 | 12 | 20,052,000 | 24 | 40,104,000 | 36 | 60,156,000 |
| FULL HOUSE | 1,075,000 | 18 | 19,350,000 | 36 | 38,700,000 | 54 | 58,050,000 |
| FOUR OF A KIND | 180,000 | 100 | 18,000,000 | 200 | 36,000,000 | 300 | 54,000,000 |
| STRAIGHT FLUSH | 26,000 | 300 | 7,800,000 | 600 | 15,600,000 | 900 | 23,400,000 |
| ROYAL FLUSH | 2,100 | 1000 | 2,100,000 | 4000 | 8,400,000 | 6000 | 12,600,000 |
| | 50,550,100 | | 183,304,000 | | 370,808,000 | | 556,212,000 |
| | | TOTAL COINS IN | 200,000,000 | TOTAL COINS IN | 400,000,000 | TOTAL COINS IN | 600,000,000 |
| | | HOLD PERCENT | 0.08348 | HOLD PERCENT | 0.07298 | HOLD PERCENT | 0.07298 |

FIG. 4C-3

| DESCRIPTION | OCCURRENCES | PAYOFF 2 COINS | TOTAL PAYOFF 2 COINS | PAYOFF 4 COINS | TOTAL PAYOFF 4 COINS | PAYOFF 6 COINS | TOTAL PAYOFF 6 COINS |
|---|---|---|---|---|---|---|---|
| JACKS OR BETTER | 25,614,000 | 1 | 25,614,000 | 2 | 51,228,000 | 3 | 76,842,000 |
| TWO PAIR | 13,229,000 | 3 | 39,687,000 | 6 | 79,374,000 | 9 | 119,061,000 |
| THREE OF A KIND | 6,441,000 | 5 | 32,205,000 | 10 | 64,410,000 | 15 | 96,615,000 |
| STRAIGHT | 2,312,000 | 10 | 23,120,000 | 20 | 46,240,000 | 30 | 69,360,000 |
| FLUSH | 1,671,000 | 15 | 25,065,000 | 30 | 50,130,000 | 45 | 75,195,000 |
| FULL HOUSE | 1,075,000 | 25 | 26,875,000 | 50 | 53,750,000 | 75 | 80,625,000 |
| FOUR OF A KIND | 180,000 | 80 | 14,400,000 | 160 | 28,800,000 | 240 | 43,200,000 |
| STRAIGHT FLUSH | 26,000 | 200 | 5,200,000 | 400 | 10,400,000 | 600 | 15,600,000 |
| ROYAL FLUSH | 2,100 | 1000 | 2,100,000 | 4000 | 8,400,000 | 6000 | 12,600,000 |
| | 50,550,100 | | 194,266,000 | | 392,732,000 | | 589,098,000 |
| | | TOTAL COINS IN | 200,000,000 | TOTAL COINS IN | 400,000,000 | TOTAL COINS IN | 600,000,000 |
| | | HOLD PERCENT | 0.02867 | HOLD PERCENT | 0.01817 | HOLD PERCENT | 0.01817 |

FIG. 4D-1

| DESCRIPTION | OCCURRENCES | PAYOFF 2 COINS | TOTAL PAYOFF 2 COINS | PAYOFF 4 COINS | TOTAL PAYOFF 4 COINS | PAYOFF 6 COINS | TOTAL PAYOFF 6 COINS |
|---|---|---|---|---|---|---|---|
| JACKS OR BETTER | 25,614,000 | 1 | 25,614,000 | 2 | 51,228,000 | 3 | 76,842,000 |
| TWO PAIR | 13,229,000 | 3 | 39,687,000 | 6 | 79,374,000 | 9 | 119,061,000 |
| THREE OF A KIND | 6,441,000 | 5 | 32,205,000 | 10 | 64,410,000 | 15 | 96,615,000 |
| STRAIGHT | 2,312,000 | 10 | 23,120,000 | 20 | 46,240,000 | 30 | 69,360,000 |
| FLUSH | 1,671,000 | 15 | 25,065,000 | 30 | 50,130,000 | 45 | 75,195,000 |
| FULL HOUSE | 1,075,000 | 20 | 21,500,000 | 40 | 43,000,000 | 60 | 64,500,000 |
| FOUR OF A KIND | 180,000 | 80 | 14,400,000 | 160 | 28,800,000 | 240 | 43,200,000 |
| STRAIGHT FLUSH | 26,000 | 200 | 5,200,000 | 400 | 10,400,000 | 600 | 15,600,000 |
| ROYAL FLUSH | 2,100 | 1000 | 2,100,000 | 4000 | 8,400,000 | 6000 | 12,600,000 |
| | 50,550,100 | | 188,891,000 | | 381,982,000 | | 572,973,000 |
| | | TOTAL COINS IN | 200,000,000 | TOTAL COINS IN | 400,000,000 | TOTAL COINS IN | 600,000,000 |
| | | HOLD PERCENT | 0.055546 | HOLD PERCENT | 0.045045 | HOLD PERCENT | 0.045045 |

FIG. 4D-2

| DESCRIPTION | OCCURRENCES | PAYOFF 2 COINS | TOTAL PAYOFF 2 COINS | PAYOFF 4 COINS | TOTAL PAYOFF 4 COINS | PAYOFF 6 COINS | TOTAL PAYOFF 6 COINS |
|---|---|---|---|---|---|---|---|
| JACKS OR BETTER | 25,614,000 | 1 | 25,614,000 | 2 | 51,228,000 | 3 | 76,842,000 |
| TWO PAIR | 13,229,000 | 3 | 39,687,000 | 6 | 79,374,000 | 9 | 119,061,000 |
| THREE OF A KIND | 6,441,000 | 5 | 32,205,000 | 10 | 64,410,000 | 15 | 96,615,000 |
| STRAIGHT | 2,312,000 | 10 | 23,120,000 | 20 | 46,240,000 | 30 | 69,360,000 |
| FLUSH | 1,671,000 | 12 | 20,052,000 | 24 | 40,104,000 | 36 | 60,156,000 |
| FULL HOUSE | 1,075,000 | 18 | 19,350,000 | 36 | 38,700,000 | 54 | 58,050,000 |
| FOUR OF A KIND | 180,000 | 80 | 14,400,000 | 160 | 28,800,000 | 240 | 43,200,000 |
| STRAIGHT FLUSH | 26,000 | 200 | 5,200,000 | 400 | 10,400,000 | 600 | 15,600,000 |
| ROYAL FLUSH | 2,100 | 1000 | 2,100,000 | 4000 | 8,400,000 | 6000 | 12,600,000 |
|  | 50,550,100 |  | 181,728,000 |  | 367,656,000 |  | 551,484,000 |
|  |  | TOTAL COINS IN | 200,000,000 | TOTAL COINS IN | 400,000,000 | TOTAL COINS IN | 600,000,000 |
|  |  | HOLD PERCENT | 0.09136 | HOLD PERCENT | 0.08086 | HOLD PERCENT | 0.08086 |

FIG. 4D-3

| COINS PLAYED | 1ST | 2ND | 3RD | 4TH | 5TH |
|---|---|---|---|---|---|
| ROYAL FLUSH | 250 | 500 | 750 | 1000 | 4000 |
| STRAIGHT FLUSH | 50 | 100 | 150 | 200 | 250 |
| FOUR OF A KIND | 25 | 50 | 75 | 100 | 125 |
| FULL HOUSE | 9 | 18 | 27 | 36 | 45 |
| FLUSH | 6 | 12 | 18 | 24 | 30 |
| STRAIGHT | 4 | 8 | 12 | 16 | 20 |
| THREE OF A KIND | 3 | 6 | 9 | 12 | 15 |
| TWO PAIR | 2 | 4 | 6 | 8 | 10 |
| PAIR TENS OR BETTER | 1 | 2 | 3 | 4 | 5 |

| COINS PLAYED | 1ST | 2ND | 3RD | 4TH | 5TH |
|---|---|---|---|---|---|
| ROYAL FLUSH | 250 | 500 | 750 | 1000 | 4000 |
| STRAIGHT FLUSH | 50 | 100 | 150 | 200 | 250 |
| FOUR OF A KIND | 25 | 50 | 75 | 100 | 125 |
| FULL HOUSE | 9 | 18 | 27 | 36 | 45 |
| FLUSH | 6 | 12 | 18 | 24 | 30 |
| STRAIGHT | 4 | 8 | 12 | 16 | 20 |
| THREE OF A KIND | 3 | 6 | 9 | 12 | 15 |
| TWO PAIR | 2 | 4 | 6 | 8 | 10 |
| PAIR TENS OR BETTER | 1 | 2 | 3 | 4 | 5 |

FIG. 11B

MODIFIED POKER CARD/TOURNAMENT GAME AND INTERACTIVE NETWORK COMPUTER SYSTEM FOR IMPLEMENTING SAME

RELATED APPLICATIONS

This application claims priority to U.S. provisional patent application Ser. No. 60/019,747, filed Jun. 14, 1996, and to U.S. provisional patent application Ser. No. 60/017,432, filed May 9, 1996.

Technical Field

The present invention relates generally to games, and more particularly, to a modified poker card/tournament game, and an interactive network computer system for playing poker. In the poker tournament game computer system, a player plays the game against the "house" or computer system. Special features are provided to enhance game play.

Background Art

The growth of the gaming industry, in particular, gambling casinos has been very significant over the last decade. The industry has come to recognize the need for new games and new gambling concepts. It also recognizes that the new technologies available need to be integrated in order to improve their gaming environment. It also recognizes the need to become a more efficient gaming provider.

The state gaming control boards of Nevada and New Jersey (which have traditionally been slow to approve any new games or gambling concepts) have changed their philosophy so dramatically that today they actively encourage the trial and acceptance of new games and gambling concepts. The problem with introducing new games has always been the basic criteria for mass-market gambling:

Easy-to-learn game rules.

Strategies must be easy to master and not favor "the expert" disproportionately.

Games must have a short duration between the start (the bet) and the finish (the payoff).

The payoff structure, that is, what can be won by a lucky player must be enticing.

The game must be fair, that is, the casino should not have an unreasonable advantage.

The game must be "secure", that is, protected from cheating and tampering.

The casino's "win" must be demonstrated to be worthwhile., that is, the "win per machine per month" must at least compare favorably to that of the "slots".

Over the years, there have been many different types of games that have attempted to satisfy the demands of the gaming industry. These games have ranged the gamut from those involving great mental prowess to games involving merely chance. Nevertheless, there is still a strong interest in game concepts that create real excitement.

More specifically, with many games the players are placed in the position of passive observers. This is actually most true of the more expensive games that employ electronic components and the like which may or may not involve any skill on the part of the player. Still further, the game development or play is almost always viewed as unrealistic (e.g., only involving luck) at best.

Because of this fact, such expensive games are often difficult to market and discarded after minimal play even when purchased by the consumer. Moreover, even when use continues, such games have consistently lacked any relationship to the excitement as well as the strategy and planning that should be the characteristic of any game. While it is generally recognized that decision making in game play is of paramount importance, there has yet to be a game that places players in a realistic decision making capacity.

One game of interest over the years is poker. Various attempts have been made to enhance play of poker over the years. Examples of such attempts are described in the following U.S. patent references, all of which are hereby incorporated by reference:

U.S. Pat. No. 4,743,022, Wood, second chance poker method; U.S. Pat. No. 4,948,134, Suttle et al., electronic five card poker game where cards are given to the players one at a time; U.S. Pat. No. 5,013,049, Tomaszewski, five card poker game where up to two cards are drawn; U.S. Pat. No. 5,118,109, Gumina, instant poker game card; U.S. Pat. No. 5,255,915, Miller, six card, two hand video poker game; U.S. Pat. No. 5,294,128, Marquez, six cards, three hand poker game; U.S. Pat. No. 5,382,025, Sklansky et al., three hands, two card poker game where each player chooses one hand and five communal cards are dealt face up; U.S. Pat. No. 5,407,199, Gumina, interactive video/casino poker game-drawpoker, hold'em poker; U.S. Pat. No. 5,415,404, Joshi et al., multiplay video poker game in which the player's sub-hands are compensated to increase the payoff level of the winning hands; U.S. Pat. No. 5,431,407, Hofberg et al., casino poker game.

U.S. Pat. No. 5,437,451 to Fulton involves a modified poker game where the player is dealt pairs of cards, where one card is optional and the other mandatory. The player is permitted to exchange at each round the optional card until five cards are selected. The resulting five card hand is then evaluated for payoff against a fairly standard payoff table.

U.S. Pat. No. 5,314,194 to Wolf deals the player seven cards. The player then forms two hands: a five card hand (e.g., a front hand), and a two card hand (e.g., a back hand). The rules for playing this game are quite elaborate, including requiring each player to arrange the hand so that the rank of the back hand is greater than the rank of the front hand.

Unfortunately, all these prior art attempts at making poker interesting and challenging have not been successful. That is, the prior art has been unable to successfully provide a poker game that combines the attributes of skill, luck, excitement and simplicity with rapid play. For example, none of the prior art references cited above relate to dealing a player two exposed cards each round from which the player selects one card and discards the other card, or builds two simultaneous five card hands. Further, none of the above prior art references relate to building a poker-type hand one card at a time, at the selection/control of the player.

In addition, what has also not been seen is a new platform to stimulate the development of new games and gambling concepts, such as poker. An interactive network also beneficially provides an open platform for any game developer to create new games and gaming concepts. The casino can offer these new games without installing additional hardware, since they will be playable from any touch screen on the interactive network. Further, an interactive network can, if properly designed, provide exciting tournament competition that cannot be implemented in other settings. Thus, the poker game can be greatly enhanced by providing this tournament setting.

Casinos provide other services to the player beyond gaming, examples:

Nightclub Entertainment
Restaurants
Transportation
Refreshments
Credit Card Verification The interactive network allows for direct interfacing from the players touch screen to any of these services. In addition, it is an open platform to any new electronic services that may become available.

The concept of casino "downtime" is a major management efficiency problem. Whenever players are not gambling they are "down", examples:

When a blackjack dealer shuffles the decks of cards—the players at his table are "down"

When a player looks for a table to play, in the game and for the stakes he wants, he is "down"

When a player changes the game he his playing and has to walk to another location.

When a player wishes to bet on a sports event or see the results of a sports bet wager, he is "down" until he returns.

When a player is intimidated from playing because of smoking or card professionals.

The interactive network can shuffle and deal in fractions of a second. A player can find his game, at his stakes, by calling up (by touch) a menu of games available. A player can "window" to sports betting while still participating in another wagering event. The interactive network makes the player anonymous and safe from smoke and card sharks. No known devices have the means to create a "dynamic" interactive network of tournaments where participants compete electronically and where there is no limit to an individual tournament size and therefore no limit to the size of the jackpot. In addition, no known electronic gaming devices have been programmed to play a game which meets all the gaming criteria listed above and allows for any sort of interactive network.

Accordingly, it is desirable to provide a modified poker game that provides a player the opportunity to exercise their skill. It is also desirable to provide a modified poker game that includes luck to make the game exciting, unpredictable and enjoyable for people of all levels of intelligence.

It is further desirable to provide a modified poker game that has simple rules so that new players may learn the game easily, including learning the appropriate strategy for the game.

It is also desirable to provide a modified poker game that can be played rapidly so that multiple games can be played between two or more players in a short period of time.

It is also desirable to provide a modified poker game that can be played between two players, or multiple players in a tournament manner.

It is further desirable to provide a modified poker game that incorporates the feature of providing bets of varying amounts the game value to further enhance the excitement of the game.

It is further desirable to provide an interactive network architecture to provide a tournament competition for the modified poker game, as well as providing a tournament structure/framework for other games.

It is further desirable to provide an interactive network architecture to provide a tournament competition for the modified poker game, as well as providing simultaneously a local or individual game that is played by the player.

SUMMARY OF THE INVENTION

It is a feature and advantage of the present invention to provide a modified poker game that permits a player the opportunity to exercise their skill.

It is another feature and advantage of the present invention to provide a modified poker game that includes luck to make the game exciting, unpredictable and enjoyable for people of all levels of intelligence.

It is another feature and advantage of the present invention to provide a modified poker game that has simple rules so that new players may learn the game easily, including learning the appropriate strategy for the game.

It is a further feature and advantage of the present invention to provide a modified poker game that can be played rapidly so that multiple games can be played between two or more players in a short period of time.

It is another feature and advantage of the present invention to provide a modified poker game that can be played between two players, or multiple players in a tournament manner.

It is another feature and advantage of the present invention to provide a modified poker game that incorporates the feature of permitting different levels of game value to further enhance the excitement of the game.

It is another feature and advantage of the present invention to provide the player the option of playing the modified poker game against a computer in a slot machine fashion.

It is another feature and advantage to provide an interactive network architecture for individual and tournament competition.

It is another feature and advantage to provide an interactive network architecture for tournament competition of the modified poker game.

It is another feature and advantage to generally provide a tournament structure/framework for tournament competition of games in a network environment.

It is another feature and advantage to provide an interactive network architecture to provide a tournament competition for the modified poker game, as well as to provide simultaneously a local or individual game that is played by the player.

The present invention is based, in part, on the discovery or realization that previous attempts at improving the poker game have been unsuccessful due to the inability to combine the attributes of skill, luck, and simplicity with rapid play.

To achieve the features and advantages of the present invention, a game device providing a modified poker card game is provided as described below. The modified poker card game allows a player to sequentially build a card hand after each round of play. The rules of play for the card game including dealing a first pair of cards to the player. The player then selects one of the pair of cards for the card hand, and discards the other card. The player repeats this process until the player has selected a predetermined number of cards that form the card hand. The resulting card hand is then compared to a predetermined winning schedule and/or to other players playing the modified poker game.

In another embodiment of the invention, a method of playing a modified poker card game allows a player to sequentially build first and second card hands after each round of play. The method includes dealing a first pair of cards to the player, and having the player select one of the cards for the first card hand, and the other card for the second card hand. This process is repeatedly performed until the player has selected a predetermined number of cards for each of the first and second card hands. The resulting first and second card hands are then compared, together or independently, to a predetermined winning schedule and/or to other players hands.

In another embodiment of the invention, an electronic system simultaneously plays a tournament game among a plurality of players playing against each other, and an individual game where the player plays against the house. The electronic system includes a central computer that performs the functions of enabling all players to select a monetary level of wagering, assigning players to the tournament game, and initiating and transmitting all events relating to the playing of the tournament to the player. The central computer also performs the functions of tabulating, storing and transmitting data received from the plurality of players in response to the tournament game, evaluating each individual game within the tournament game to determine a winner for the tournament game, and distributing a tournament award. The electronic system also includes a plurality of player workstations, one player workstation for each player. Each player workstation is electronically connected to the central computer. Each player workstation performs the functions of electronically receiving and displaying tournament data from the central computer and from each player, and transmitting player inputs for the tournament to the central computer. Each player workstation also performs the functions of transmitting wagering data from the player to the central computer, and processing the player inputs for the individual game and distributing an individual award responsive thereto.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIGS. 4A-4D are new payoff tables utilized by the MODIFIED POKER game computer system;

FIGS. 11A-11B are illustrations of the interactive user interface in the MODIFIED POKER game computer system when the player wins;

BEST MODE FOR CARRYING OUT THE INVENTION

General Description of MODIFIED POKER Game

The following describes the basic components and rules for playing the modified poker game. A card/video game (table game or video touch screen) with payoffs according to a predetermined payoff table is provided for a modified five card poker game. The lowest payoff is for two pairs of cards going up to royal straight flush. In a first version of the game, each player is given two exposed cards at a time from which the player selects one and discards the other. This process continues until each player has five cards. In other words, five pairs of cards are exposed from which the player chooses one each time trying to make the best poker hand possible. The discarded card is not shown again. The subsequently built five card hand is then evaluated for payoff.

In a second version of the game, instead of discarding the unselected card, two hands are constructed. That is, as each pair of cards are given to the player, the player creates two hands. In this version, the player is offered two cards per round, each round from which the player chooses one card for each hand. This process is continued for five rounds until the player has two hands of five cards each. Thus, at the end of the ten cards, two hands are constructed with five cards each. The payoff tables are predetermined according to the probability of constructing certain combinations of good hands from both of the two hands, not just one.

In general, for either the first or second versions of the game, five players, for example, can play the game together for amusement by exposing selected cards or no cards of the card hand. The players may play against each other for the best hand where the player with the best hand wins and collects the wagers of all other players in the hand. The game can also be utilized where all players play against the casino, a bank player, or against a payoff table.

Hardware/Process Description of Gaming Station

Figure 1:
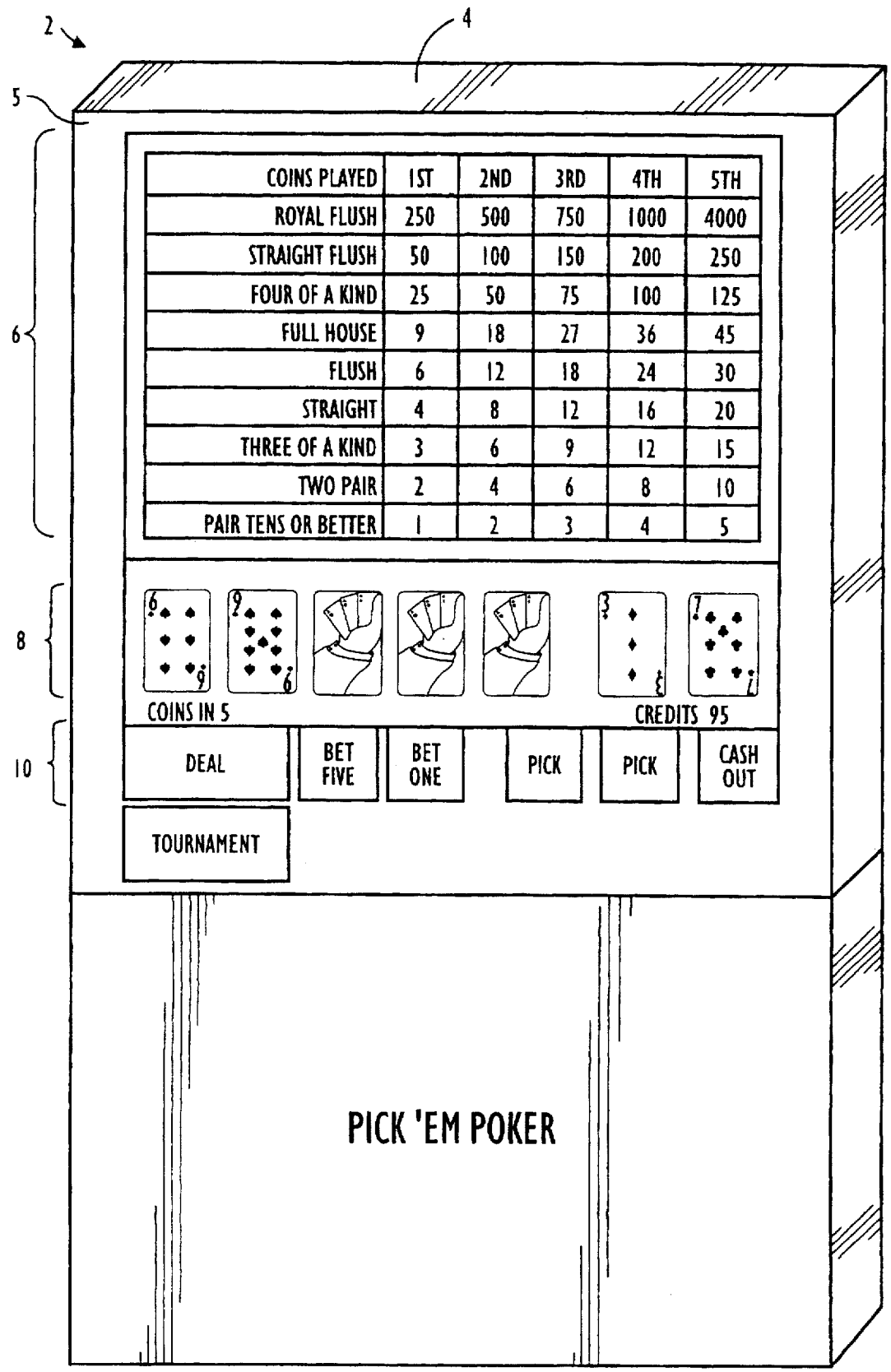
FIG. 1 is an illustration of the MODIFIED POKER game computer system illustrating a first game layout design displayed thereon.

FIG. 1 is an illustration of the MODIFIED POKER game computer system with a first interface design illustrated thereon. In FIG. 1, MODIFIED POKER game computer system 2 includes computer hardware and software as described below used to implement the MODIFIED POKER game. The computer hardware and software are included in computer 4 which can be any standard computer, such as a personal computer having a 486 microprocessor and standard hard disk drive accessories utilized in conjunction therewith. Computer 4 includes, preferably, computer display 5 having payoff or winning display area 6 and display area 8 for illustrating progression of the MODIFIED POKER game.

Computer display 5 also includes preferably display area 10 which is used for permitting the player to start and stop a game, select or choose the desired card, and to enter the appropriate wager. Display area 10 is preferably comprised of a standard touch screen area where the user can quickly enter the desired actions or selections. As can be readily seen in display area 10, the player has only 6 buttons or selections that are possible from the beginning of the game until the player chooses to terminate the game. These 6 buttons in display area 10 are described in greater detail below. Of course, other user interface/button designs may be utilized.

Figure 2:
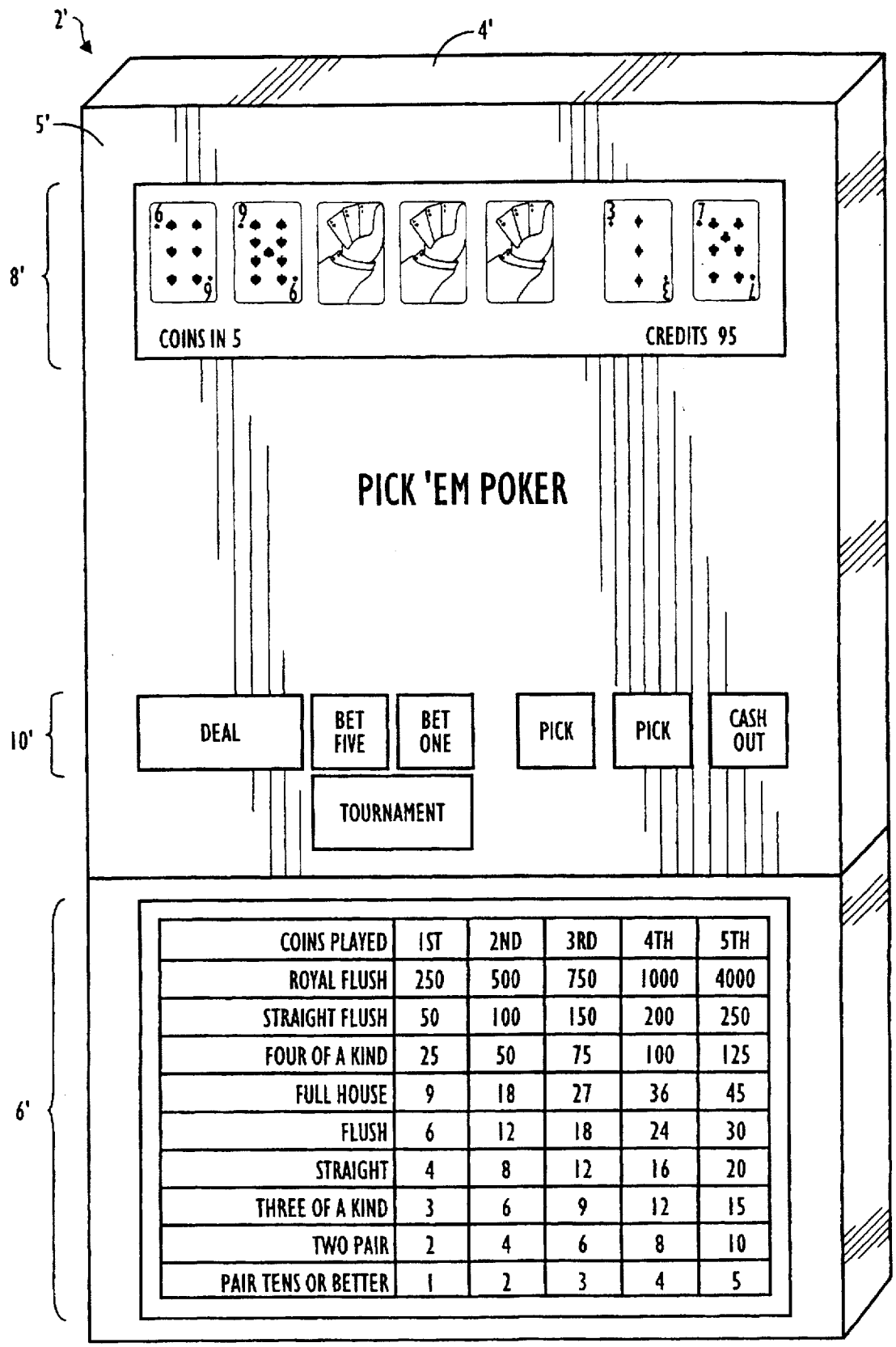
FIG. 2 is an illustration of the MODIFIED POKER game computer system illustrating a second game layout design displayed thereon.

FIG. 2 is an illustration of the MODIFIED POKER game computer system in accordance with a second design layout. As illustrated in FIG. 2, the MODIFIED POKER game computer system 2' includes modified computer system 4' with a modified computer display 5'. In computer system 4', the display 6' of possible winnings or "odds table" is displayed on the lower part of the computer system 4'. Display area 8' which illustrates the progression of the MODIFIED POKER game is disposed in an upper area of computer 4'. User interactive display area 10' is disposed in a similar location illustrated in FIG. 1.

Figure 3:
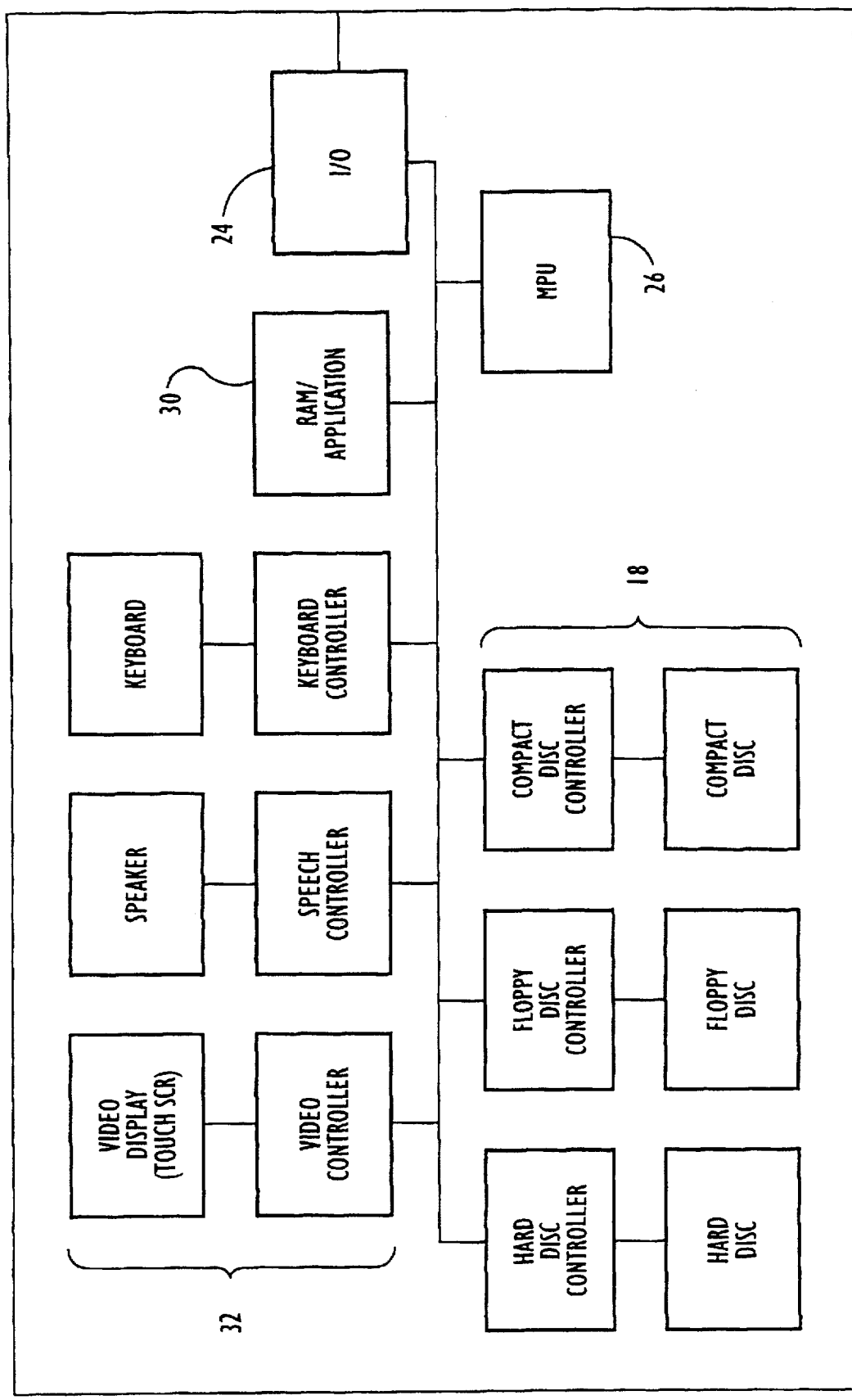
FIG. 3 is an illustration of the hardware used in the MODIFIED POKER game computer system.

FIG. 3 is an illustration of the hardware utilized in the MODIFIED POKER game computer system. In FIG. 3, computer hardware 16 includes various storage devices 18 including hard disk drive, floppy disk drive and/or compact disk drive. Each of these storage devices includes a respective controller for controlling the reading of data from and/or writing of data to the various storage devices. Input/output (I/O) device 24 provides the gateway or connection from computer hardware 16 to possible external devices. For example, input/output device 24 may connect to other computers in a network environment. See, for example, U.S. Provisional patents Ser. No. 60/011,574, filed Feb. 13, 1996, Ser. No. 60/011,573, filed Feb. 13, 1996, Ser. No. 60/013, 798, filed Mar. 21, 1996, and Ser. No. 60/013,801, filed Mar. 21, 1996, incorporated herein by reference.

Main processing unit 26 performs the execution of the computer implemented functions for the MODIFIED POKER game computer system. Computer hardware 16 also includes random access memory (RAM) 30 which is used to store some of the basic routines for booting computer hardware 16, as well as other common functions of main processing unit 26. Computer hardware 16 also includes user interface devices such as a video display, a speaker and/or a keyboard. Each of these user interface devices also includes respective controllers for controlling the transmission of the required data for properly utilizing the user interface devices.

Figure 4:
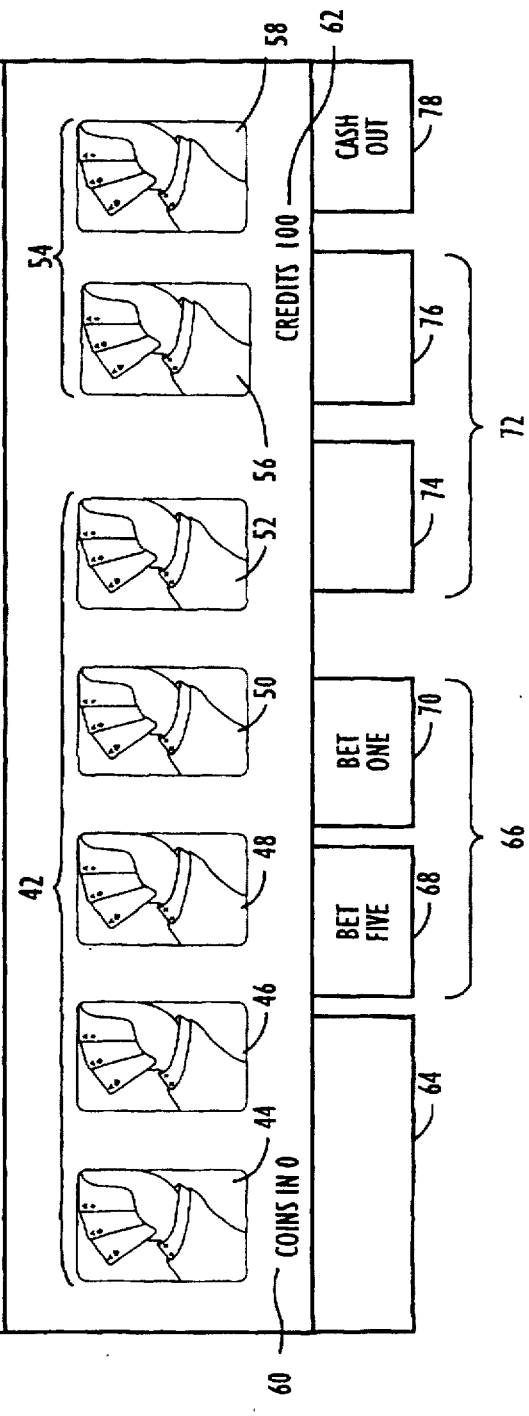
FIGS. 4 and 5-10 are illustrations of the interactive user interface according to a first design used when playing the MODIFIED POKER game computer system and when the player loses the game.

FIG. 4 is an illustration of the user interface display in accordance with a first design layout in the MODIFIED POKER game computer system. In FIG. 4, display area 5 includes winning card hands 34 which describes the card hands which the player will win in the MODIFIED POKER card game. Coin/token column indicator 36 displays the specific payoff or award when 1–5 coins/tokens are entered in the MODIFIED POKER computer game. Each column represents a specific number of coins/tokens that have been entered. Payoff or prize table 38 lists the specific prize awarded to the player for each specific winning card hand in accordance with the number of coins/tokens that have been wagered or played. Note that in payoff/prize table 38, a special bonus prize 40 is provided when the player obtains a royal flush card hand with five coins/tokens being played. This bonus prize 40 provides the incentive for the player to wager or play five coins for a specific round or game of MODIFIED POKER.

Of course, other payoff tables may also be used. For example, we have advantageously developed a new payoff table that provides several significant advantages over conventional payoff tables. See, for example, U.S. Pat. Nos. 5,437,451; 5,382,025; 5,225,915; and 4,948,134, all of which are hereby incorporated herein by reference as examples of standard payoff tables.

On the other hand, there have also been prior attempts at altering the standard payoff table without successful results. For example, in U.S. Pat. No. 5,415,404, the payoff table has been altered by awarding the player with the same return for either "Jacks or Better" and "Two Pair." However, this severely distorts the payoffs/awards not in accordance with the appropriate probabilities. That is, over 80% of the card hands according to this revised table do not ever win to provide the higher payoffs for the more difficult card hands.

According to our new payoff table in FIGS. 4A–4D, the first level of winning, for example in the payoff table-a pair of jacks or better, only provides half the investment or wager (i.e., an amount less than the original wager/investment), thereby providing additional winnings for the game operator. These additional winnings can then advantageously be distributed to other winning hands that have not traditionally been awarded in accordance with or on par with the associated probability for obtaining such a hand. Thus, for example, with respect to the payoff tables in FIGS. 4A–4D, the winning hands that have an increased payoff schedule include, for example, a straight, a flush or a full house. The reason why these hands have increased returns is that the initial or lowest payoff for the player has been reduced from an even payoff, 1–1, to a less than even payoff, e.g., 2–1.

This new payoff schedule provides the following benefits. First, the new payoff table provides a more realistic poker or MODIFIED poker award in accordance with the associated probabilities. For example, in FIG. 4A(a), a Straight receives a return of 6 to 1, Two Pair receives a return of 1.5 to 1, and Jacks or Better receives a return of 0.5 to 1. Thus, there is the appropriate award for the player responsive to the according probabilities.

A second benefit we have realized is that in the past, players would not attempt to form a card hand when the award was not commensurate with the card hand's probability. Thus, a player would prefer obtaining a lesser return because the card hand had a much higher probability of being obtained than a more difficult card hand that did not have a return commensurate with the associated probability. Thus, for example, we have determined that many players would not even attempt to form a Straight or Flush card hand because the associated reward was small (e.g., 3 or 4 to 1) in relation to the probability of forming same. Thus, players would generally attempt to form either Three of a Kind with a lower probability, or more difficult hands where the awards were much greater. The end result of our revised payoff table is that since the awards a re commensurate with the associated probability for forming the card hand, the only motivation for attempting to form a specific card hand related the players risk tolerance or desired award.

A third benefit we have discovered using our revised payoff table is that because less than an even award is provided for the first typically eligible card hand (e.g., Jacks or Better), the entire payoff table is easily manipulated to create higher awards without distorting other awards for other card hands having different probabilities. For example, compare the different payoff schedules between FIG. 4A and 4B for the same game of video poker.

A fourth benefit that we have realized that results from our revised payoff table is that the payoff table eliminates too many options for the player. In general, the playing/gaming industry favors providing players with less choices. The reason is that players tend to play more games and wager more when presented with less options. According to our revised payoff table, therefore, only wagers of 2 or 4 units/coins are permitted. This condensed payoff table, we have found, provides the player with less choices that are more valuable to the game controller or operator, i.e., an investment of 2 or 4 units.

In FIG. 4, player card area 42 includes the five player selected cards 44, 46, 48, 50 and 52, and the player has not yet selected any cards. Dealt card area 54 includes two cards, 56, 58, which are dealt to player for selection at each of the five rounds in MODIFIED POKER. The player then selects either card 56 or card 58 for each round. The selected card is then transferred to an appropriate area in player card area 42. For example, if the player is being dealt the third round of cards 56, 58 in dealt card area 54, the selected card will then be transferred to third card area 48.

Total coins/tokens played display area 60 identifies the amount of coins/tokens which are currently being played. Total player credit display area 62 displays the total amount of player credits that are available for playing one or more additional MODIFIED POKER games.

Start or deal button 64 is a button or touch screen area that begins the MODIFIED POKER game. Coins to be played buttons 66 are buttons or touch screen areas that allow the player to enter the number of coins to be played in the MODIFIED POKER game computer system. For example, if the player wants to enter ten tokens for play, the player can press the "Bet Five" button 68 twice. On the other hand, if the player wants to enter three tokens for playing MODIFIED POKER, the player can press the "Bet One" button three times to enter the desired number of coins/tokens.

Once the player is dealt a pair of cards 56, 58 in dealt card area 54 for selection, the player selects card 56 or card 58 via pick or selection buttons 74, 76 in pick card area 72. For example, if the player wants to select the second card 58 in dealt card area 54, the player presses pick card button 76 which is directly below card 58. Similarly, the player wants to select card 56, the player presses pick card button 74. The player may only depress one of the pick card button 74 or 76 for each round of play. Finally, end button or touch screen area 78 ends the player's turn for playing the MODIFIED POKER game and returns all remaining credits to the player, i.e., the player cashes out of the MODIFIED POKER game.

Figure 5:
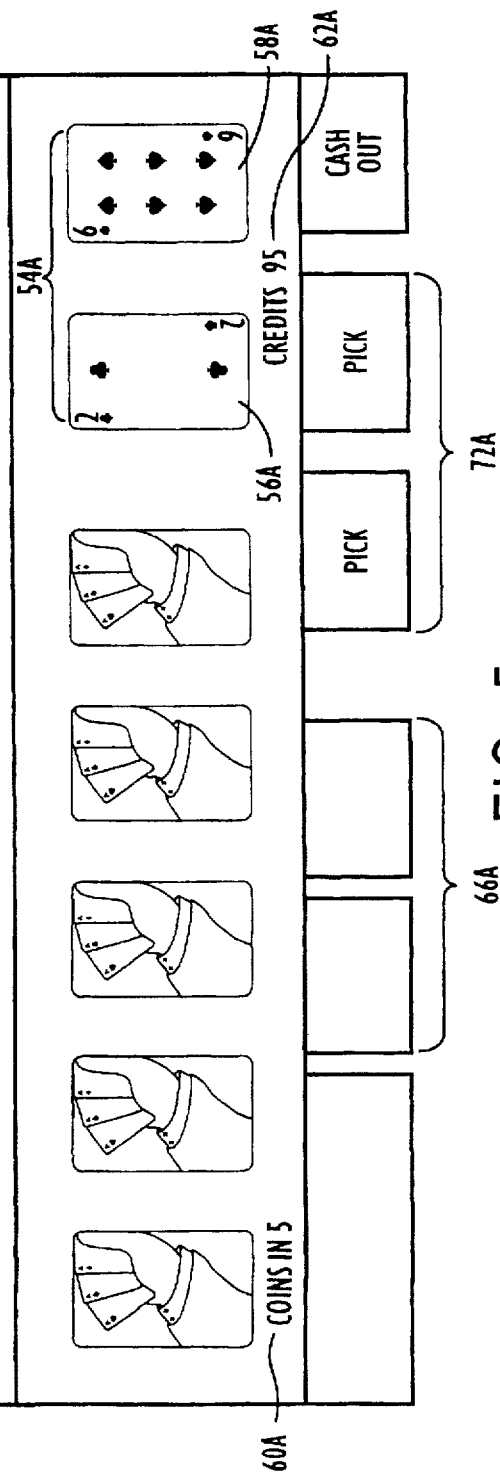

FIG. 5 illustrates the first round of play of the MODIFIED POKER game computer system. In FIG. 5, the player has been dealt a first pair of cards 56A, 58A in dealt card area 54A. The player has also entered five coins or tokens for play in coin/token area 60A. The total remaining playing credits are therefore 95 (i.e., original 100 credits minus five credits being played), which is displayed in remaining player credit display area 62A. Since the player has already selected the number of coins or tokens to be played, the coins to be played buttons 66A are no longer illuminated. In addition, since the player must now select between cards 56A, 58A in dealt card area 54A, the pick or select card area 72A is illuminated.

Figure 6:
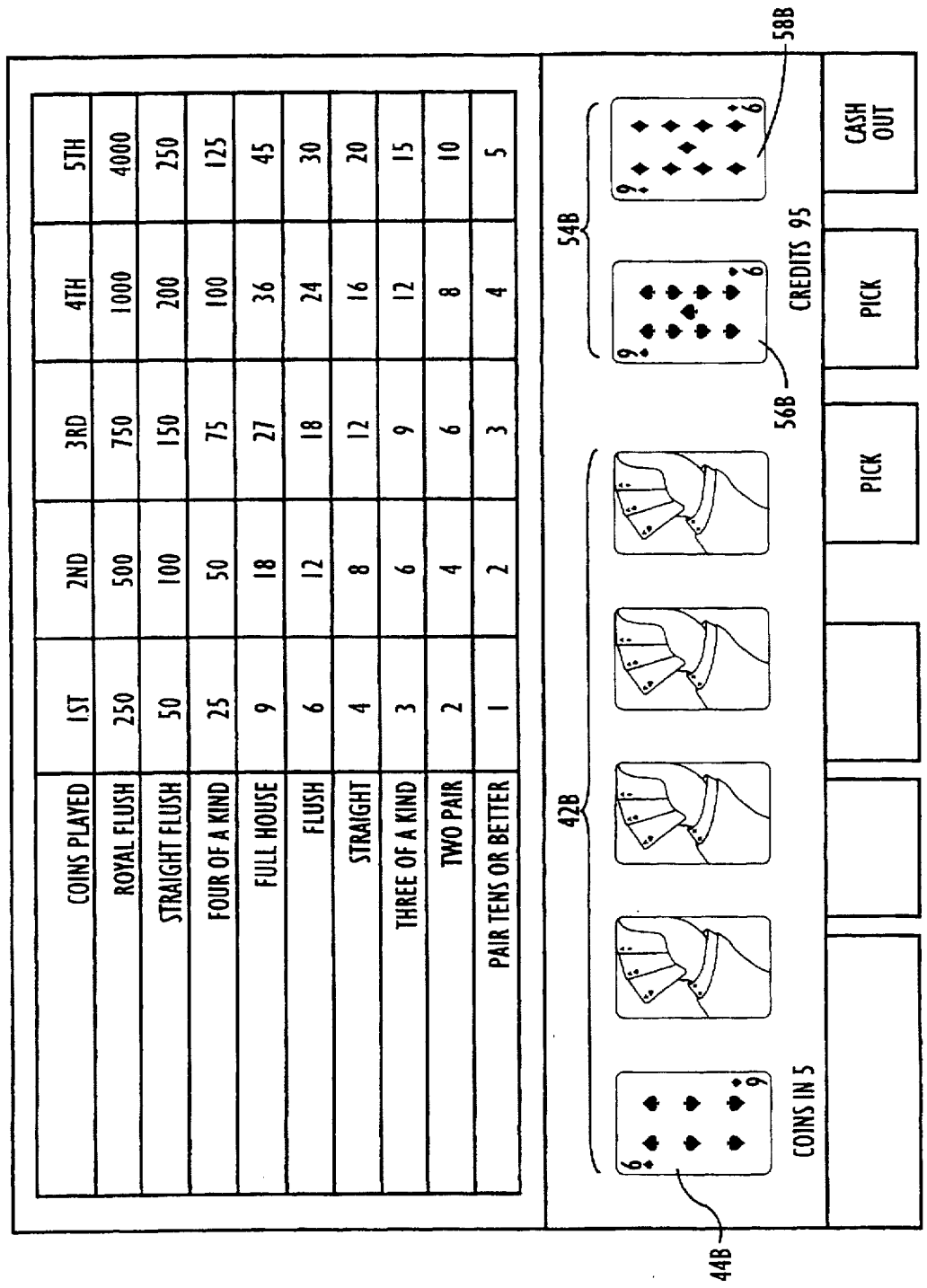

FIG. 6 is an illustration of the second round of the MODIFIED POKER game computer system after the player has selected one card from the first pair of dealt cards illustrated in FIG. 5. In FIG. 6, the player has selected the six of spades for the first player card select area 44B in the player card select area 42B. In addition, the player has been dealt a second pair of cards 56B and 58B in the dealt card area 54B for selection.

Figure 7:
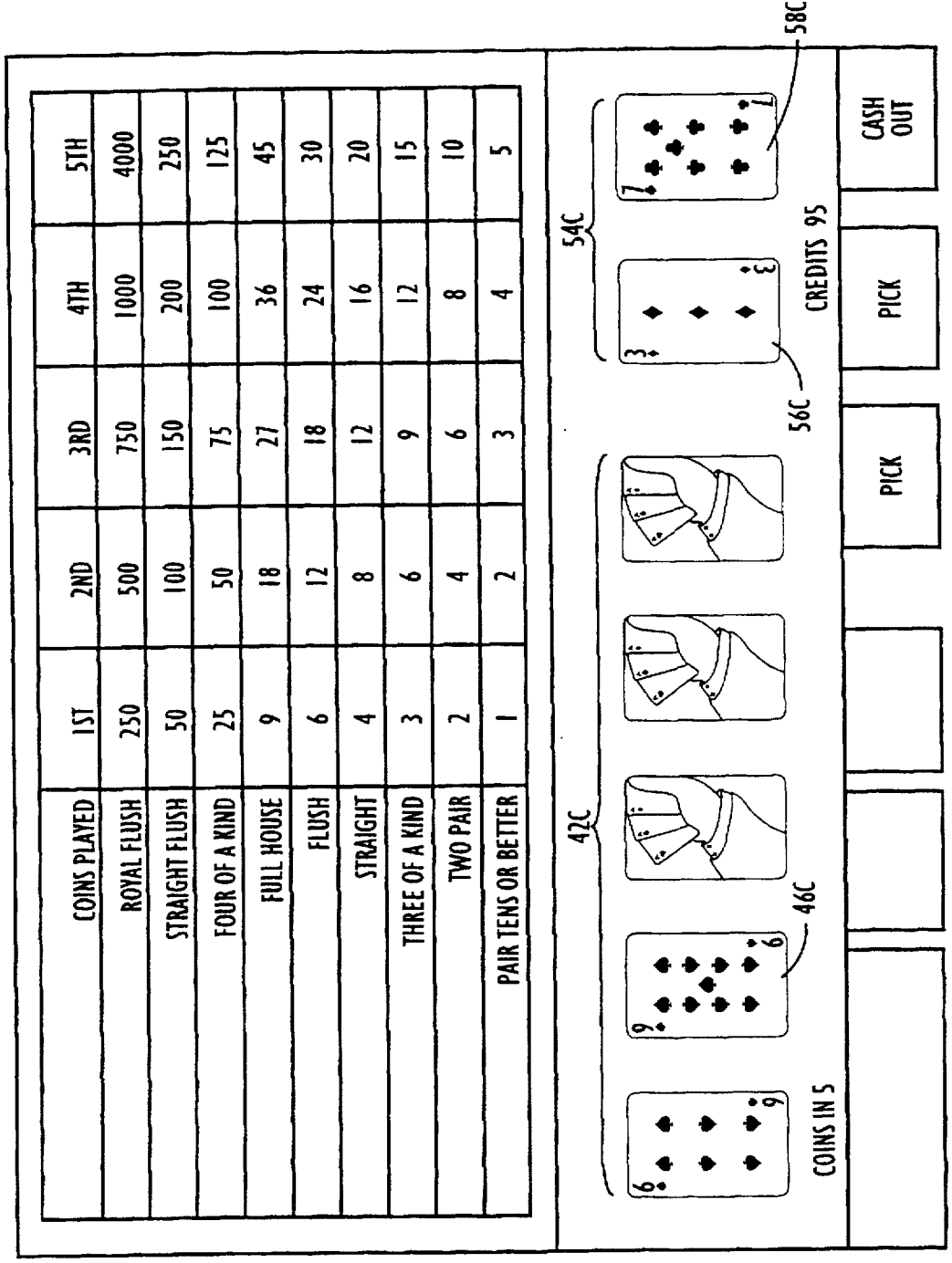

FIG. 7 is an illustration of a third round of the MODIFIED POKER game computer system where the player has selected a second card from the second round illustrated in FIG. 6. In FIG. 7, the player has selected a nine of spades from the pair of cards dealt in the second round which is illustrated in the second player card selected area 46C of the overall player card area 42C. In addition, the player has been dealt a third pair of dealt cards 56C and 58C in the dealt card area 54C.

Figure 8:
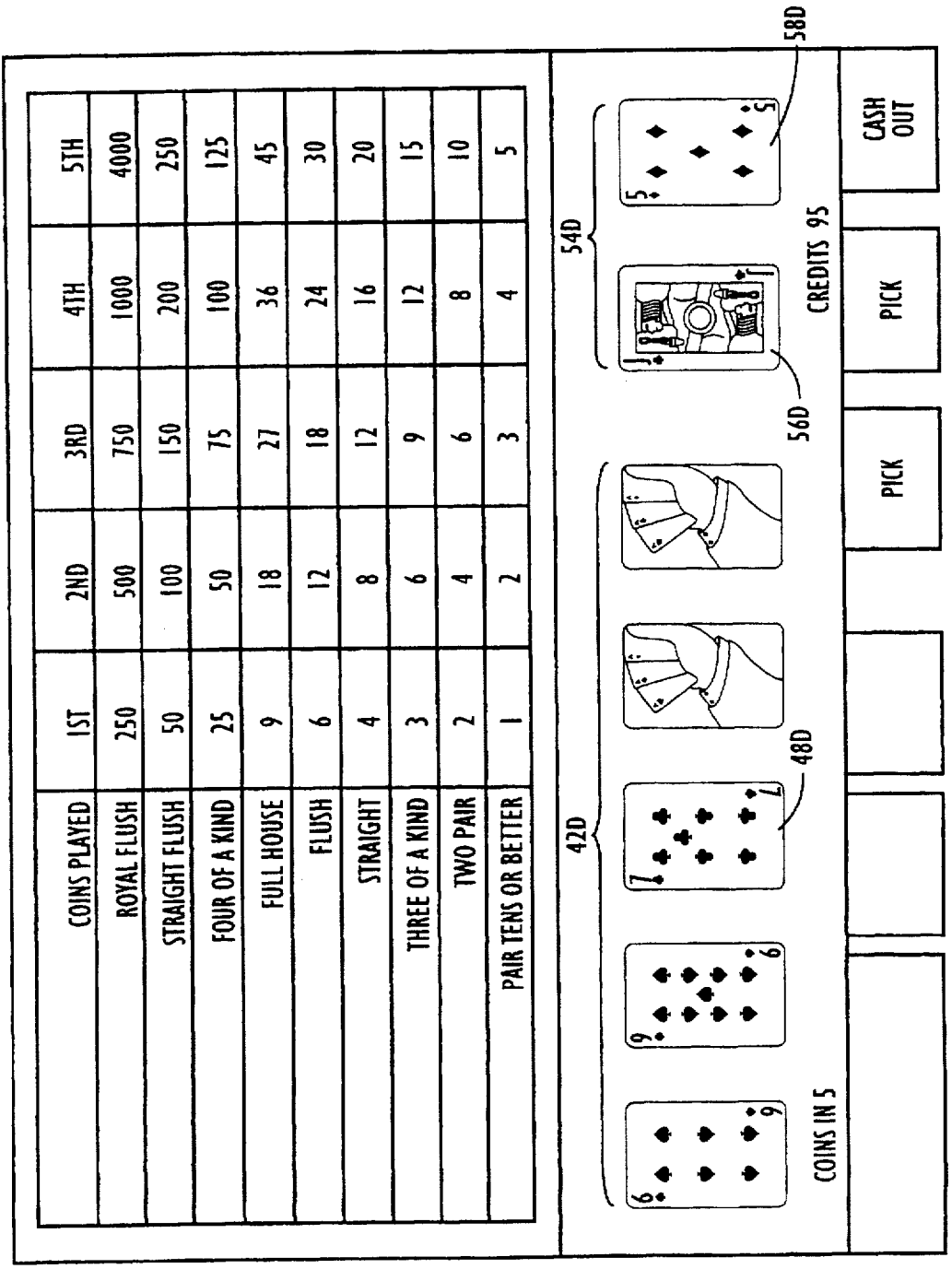

FIG. 8 is an illustration of a fourth round of the MODIFIED POKER game computer system where the player has selected a third card from the third round of the MODIFIED POKER game displayed in FIG. 7. In FIG. 8, the player has selected a seven of clubs which is displayed in the third card selected area 48D of the overall player card area 42D. In addition, the player has been dealt a fourth pair of dealt cards 56D and 58D in the dealt card area 54D.

Figure 9:
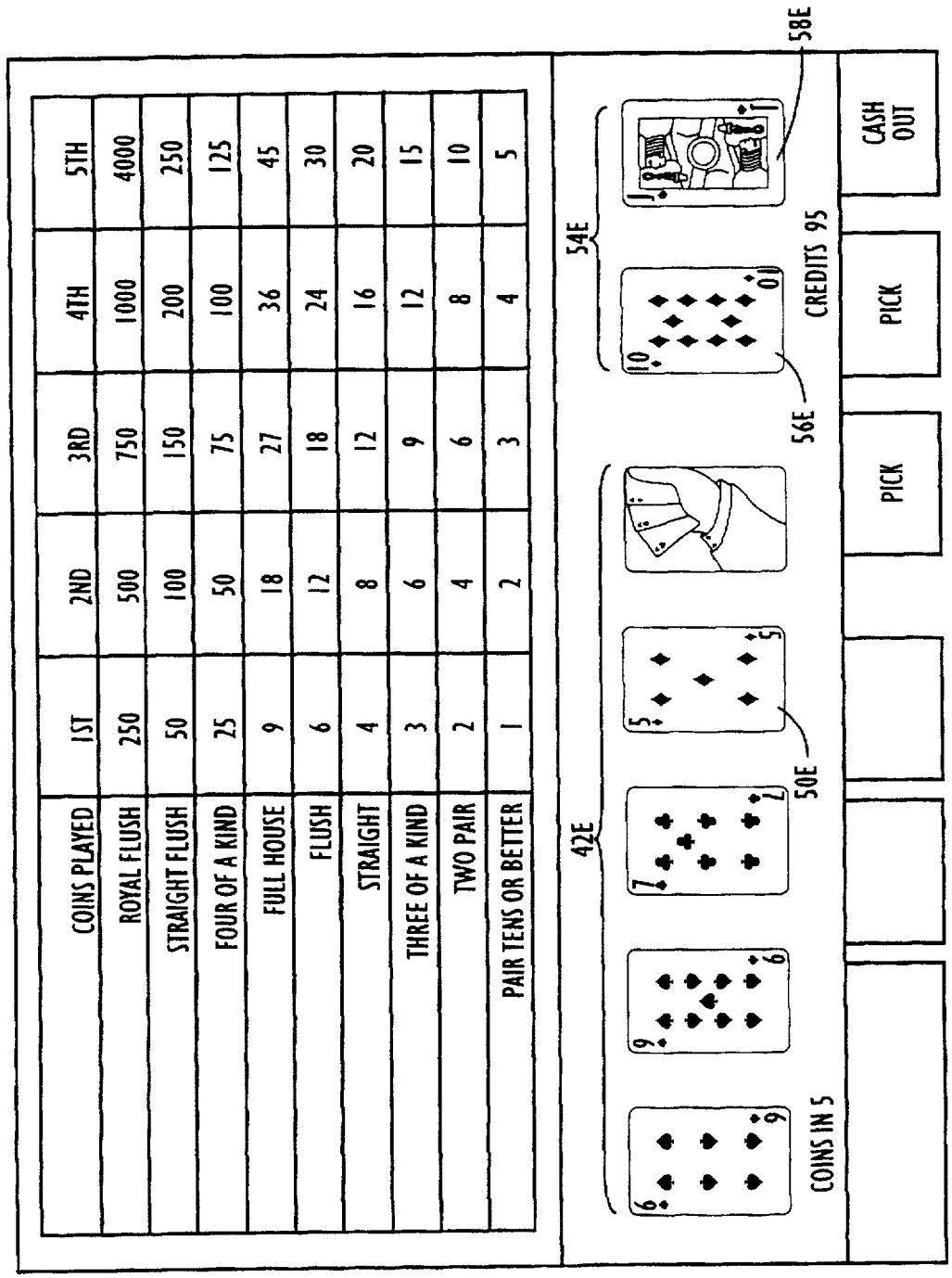

FIG. 9 is an illustration of the fifth round of the MODIFIED POKER game computer system where the player has selected a fourth card from the fourth round of the MODIFIED POKER game illustrated in FIG. 8. In FIG. 9, the player has selected a five of diamonds as the fourth card in the display area 50E of the overall player card area 42E. Since the player has not received any pairs of the same card of ten or higher, the player is now attempting to obtain a straight flush. The royal flush is no longer possible since the player has selected cards of more than one suit, i.e., spades, clubs and diamonds. In addition, the player has been dealt the fifth or last pair of cards 56E and 58E in the dealt card area 54E.

Figure 10:
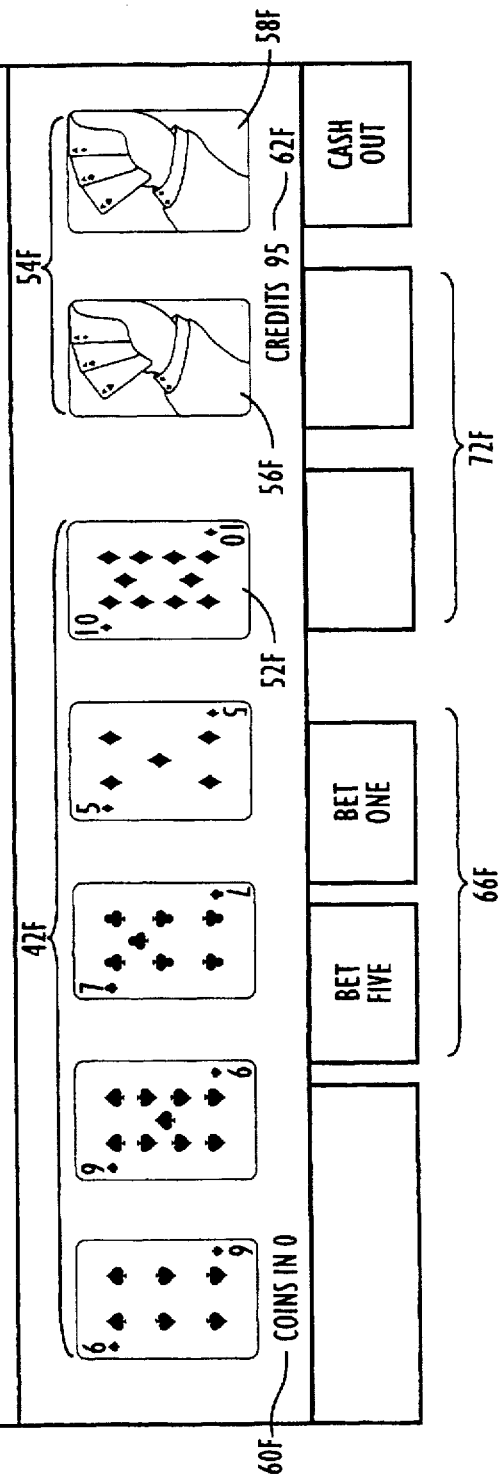

FIG. 10 is an illustration of the MODIFIED POKER game computer system where the player has selected the fifth and final card from the fifth round of the MODIFIED POKER game illustrated in FIG. 9. In FIG. 10, the player has selected a ten of diamonds as the final card in selected card area 52F in the overall card area 42F. Note that no pairs of cards 56F, 58F have been dealt to the player in dealt card area 54F. Since the player has not obtained a pair of tens or better, the player has lost this MODIFIED POKER game. Accordingly, the total player credits remaining in display area 62F is 95. In addition, since the MODIFIED POKER game has been completed, the total coins/tokens that have been entered for play in coin/token area 60F is now 0. Since the MODIFIED POKER game has been completed, the tokens to be played buttons 66F are illuminated for beginning a new game, and the player card select button 72F is no longer illuminated.

Figure 11A:
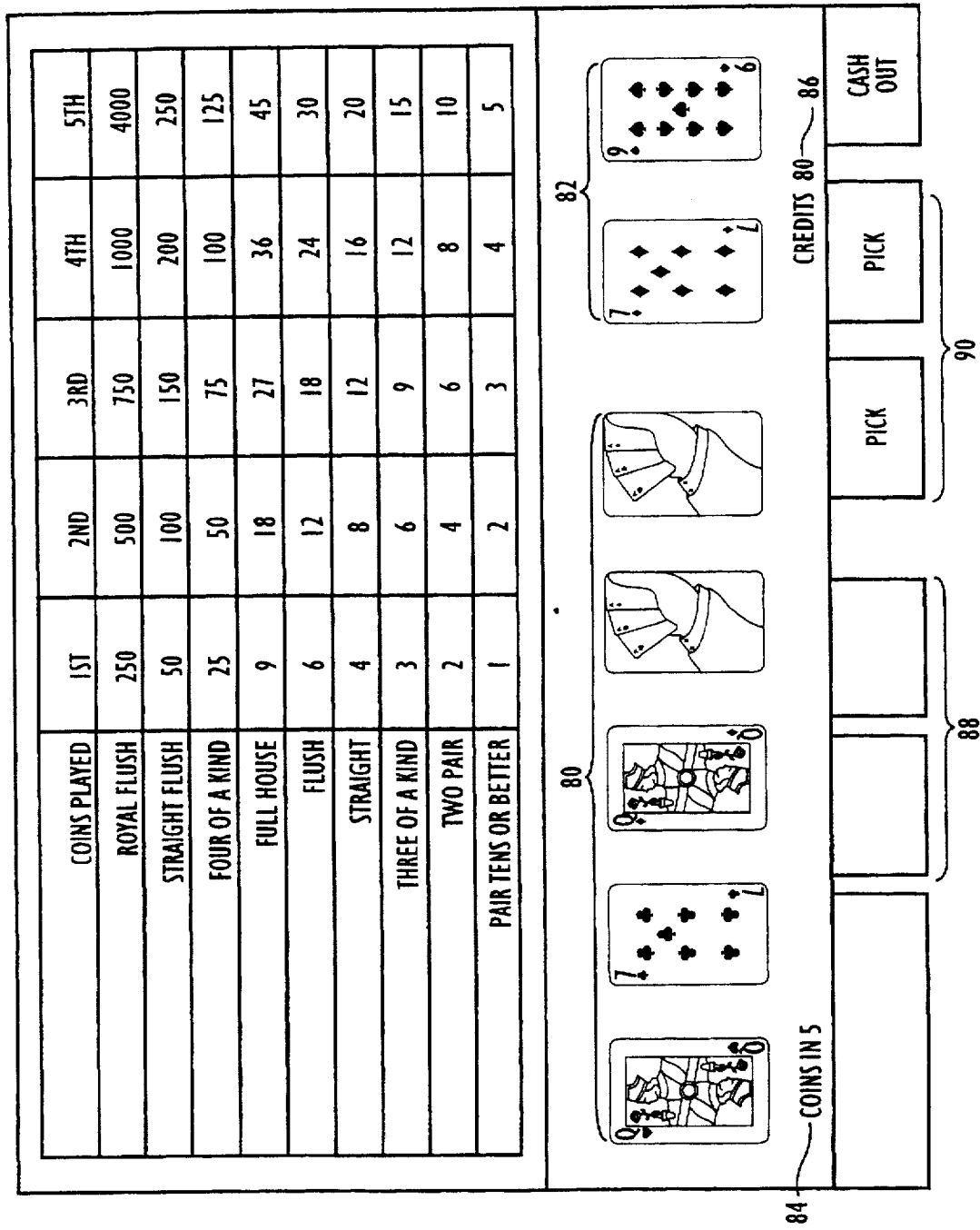

FIG. 11A is an illustration of a second MODIFIED POKER game in progress. In FIG. 11A, the player has already been dealt three rounds of the MODIFIED POKER game, and has selected a corresponding three cards from the three pairs of cards previously dealt in the player card area 80, i.e., the queen of hearts, a seven of clubs and a queen of diamonds. In addition, the player has been dealt a fourth pair of cards in dealt card area 82, i.e., a seven of diamonds and a nine of spades. Note that for this game, the player has entered five coins or tokens in coins/tokens display area 84, and that the total player credits available for additional MODIFIED POKER games is 80 in player credit area 86. Since the MODIFIED POKER game is in progress, the coin/token enter buttons 88 are not illuminated, and the card select buttons 90 are illuminated for selecting one of the pair of cards displayed in dealt card area 82. FIG. 11B is an illustration of the final player hand for the second computer game illustrated previously in FIG. 11A. In FIG. 11B, the player has selected the seven of diamonds from the fourth round of the MODIFIED POKER game illustrated in FIG. 11A. In addition, the player has also selected a six of spades from the fifth round of the MODIFIED POKER game (not illustrated). The seven of diamonds and the six of spades are illustrated in the player card area 92. Since all cards have been dealt to the player, the dealt card area 82A is empty or inactive. In addition, since the game has been completed, the tokens or coins which are currently entered in the MODIFIED POKER game computer system in area 84A is 0, the coin/token enter buttons 88A are illuminated, and the card select buttons 90A are not illuminated.

The player has won this game of MODIFIED POKER by having two pairs, i.e., a pair of queens and a pair of sevens. The player is notified of the winning two pair card hand in area 94, and the winnings are displayed in area 96, i.e., the player entered five coins/tokens and doubled his/her tokens equaling ten, as also illustrated at area 98 of display 5.

Finally, the remaining credits available are incremented by ten and the player credits available for additional game area 86A total now 90 credits that are available for further play and/or cash-out by the player.

The above description of the MODIFIED POKER game with reference to FIGS. 1–11B are exemplary of the MODIFIED POKER game where the player selects a card from the pair of dealt cards and discards the remaining cards, leaving a single five card hand after all five rounds of the MODIFIED POKER game.

On the other hand, the MODIFIED POKER game can also be used to play two simultaneous five card hands. In this embodiment or version of the MODIFIED POKER game described above, the player selects a first card from the pair of dealt cards in each round for the first hand, and selects the second or remaining card from the pair of dealt cards for the second hand. The player may be considered to be the winner if either (1) the first hand contains, for example, a pair of 10's or better; and/or (2) the second hand contains, for example, a pair of 10's or better; and/or (3) the combination of the first and second hands contains, for example, two pair or better. Corresponding returns or prizes awarded for this game may also be developed in accordance with an appropriate probability table.

While the MODIFIED POKER game has been illustrated for implementation on a computer system, the MODIFIED POKER game can also be played in a casino environment as a table game where all players play against the house or casino, or where all players except one play against another player who is acting as the dealer or bank.

The MODIFIED POKER game therefore provides dynamic strategies during a single game in a fast paced and exciting setting. Accordingly, the MODIFIED POKER game requires players to make multiple decisions and provide exciting opportunities for dynamic strategies.

Network Hardware for Games w/Tournament MODIFIED POKER

The system for an interactive network of players being grouped into ranking tournaments, where each player has his/her own electronic console connected to the established network, all of which is controlled through a series of network servers which determine the field for each tournament and which control the play of each game and control the betting and the accounting functions and provide for managerial control consoles and managerial output devices for security and accounting purposes.

Inclusive within the concept of dynamic grouping of players are the following:

That the set of players available to form a tournament is constantly changing.

Players who have just completed a tournament are immediately available for additional play.

Players who have just sat down at an available station and have informed the INRTGS (Interactive Network Ranking Tournament Gaming System) of their GPP (Game Preference Parameters), that is, (a) Game Choice and (b) Game Bet Players who have just completed play and wish to Quit Out of the system—or—to change their GPP (Game Preference Parameters such as tournament play, stand-alone play, Jackpot Entry Fee, and the like).

Players who are currently playing in an ongoing tournament, but the tournament will end before the next tournament that is being formed starts.

The dynamic grouping logic of INRTGS allows for the formation of the largest tournaments possible—within pre-established tournament setup time constraints. The fundamental constraint of the dynamic grouping logic is that no player should wait more than a limited and casino specified time before playing—for example, 20 seconds. For the benefit of the casino and the players the game duration is minimized by:

Using the optimum hardware available, that is, very high speed workstations and very powerful network servers with fiber-optic links. Touch Screens are used throughout INRTGS. Note the scope of this invention is not in any way limited to the hardware configurations described herein. If at any time in the future, because of new technology, faster processing becomes available then the use of that technology is not precluded from the scope of this invention.

Time Bar constraint displays will clearly notify players to speed up their play or suffer the consequences of a possible tournament forfeit.

Figure 12:
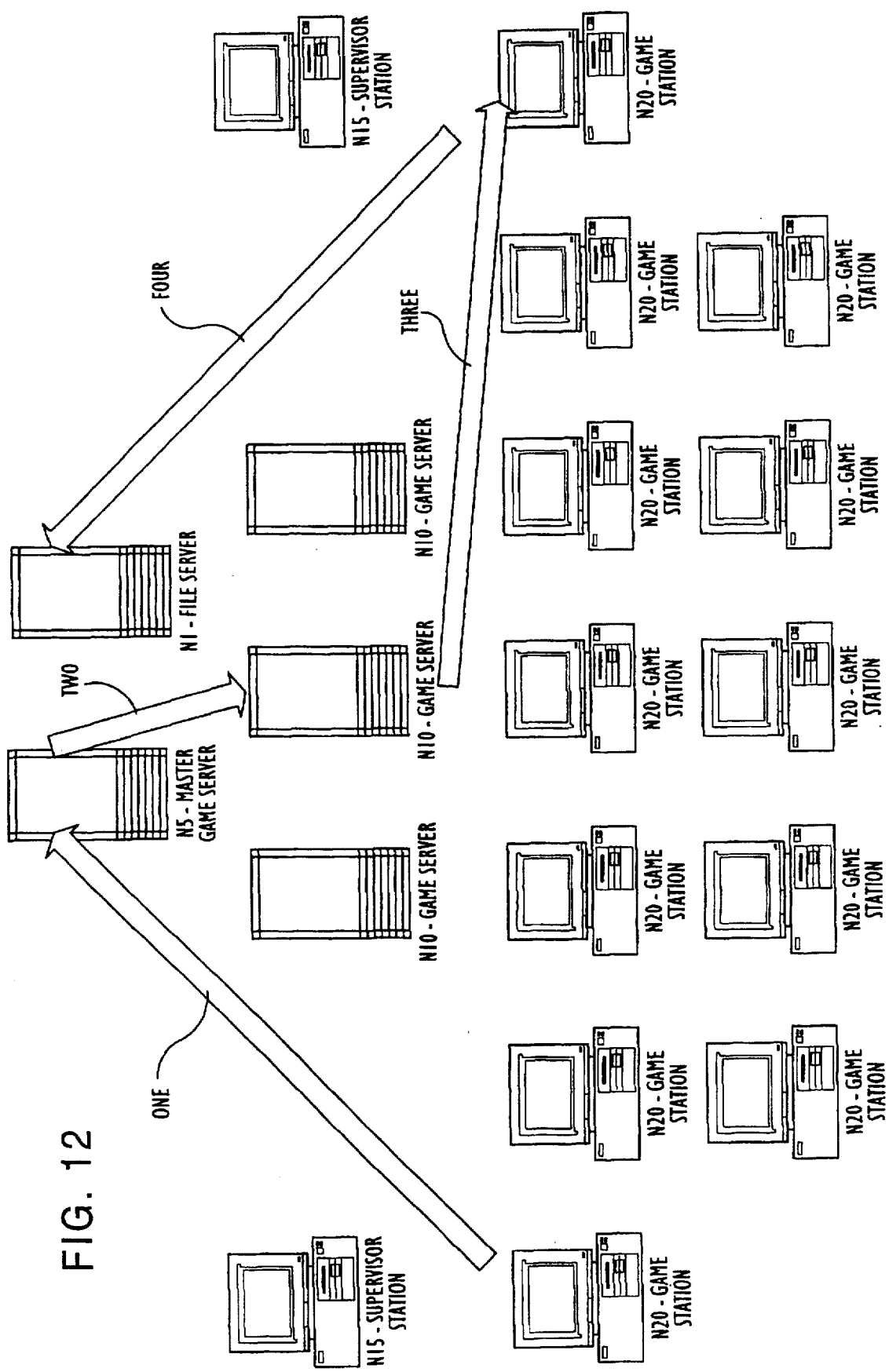
FIG. 12 is a block diagram of the computer architecture in accordance with the network casino embodiment.

One example of a game that is suitable for the network casino environment is the above described MODIFIED POKER game. The following discussion relates to FIG. 12 for the hardware configuration of the network casino:

N1. File Server
Location: In Control Room.
Hardware: Pentium based Compaq Rack Mount Server System with Mirrored Servers via a fiber link and standby hot-spare.
Operating System: Novell Netware 4.1 SFT.
Function: Central file storage for all stations. The file server is where all data is written to, all current game situations are stored and the central validation point for all connections.

N5. Master Game Server.
Location: In Control Room.
Hardware: Pentium based Compaq Rack Mount Server System with standby hot-spare unit.
Operating System: Microsoft Windows NT 3.51 Advanced Server.
Function: Establish sessions between idle stations, finds another game station within any game server domain and joins the game stations in a session.

N10. Game Servers.
Location: In Control Room.
Hardware: Pentium based Compaq Rack Mount Server System with standby hot-spare unit.
Operating System: Microsoft Windows NT 3.51 Advanced Server.
Function: Controls a domain (group of game stations). A game server is the "scorekeeper" of each game in progress. The game server controls the start, play, end and payout of each game in its domain. The game server does not determine the participants. That function is controlled by the Master Game Server (N5).

N15. Supervisory Stations.
Location: On Casino Floor.
Hardware: Pentium Based Compaq Desktop Unit.
Operating System: Microsoft Windows NT 3.51 Workstation.
Function: To monitor games in progress, allow supervisor to check game flow, receive message from monitoring hardware in case of malfunction or user help request. A supervisory station monitors games for circumstances such as unresponding players, unusually large game in progress or other issues regarding the continuation of play.

N20. Gaming Stations
Location: On Casino floor.

Hardware: Pentium Based Compaq Desktop Unit in Kiosk Cabinet with Touch Screen.
Operating System: Microsoft Windows 95
Function: Actual play station for participating in a game.

Game Flow Overview for Network Hardware

1. Gaming Stations (N20) ask Master Game Sever (N5) for a "request to participate".
2. Master Game Server (N5) assigns Game Station (N20) to a Game Server (N10) for a "session start".
3. Supervisory Station (N15) is informed of a new game forming and its participating stations.
4. Game Server (N10) ends further participation and a "begin game" is initiated between all participating Game Stations (N20).
5. Supervisory Station (N15) is informed of a new game starting and its participating stations.
6. As play progresses, all "moves" by games stations are recorded to the File Server (N1).
7. Supervisor Station (N15) is kept informed of any unusual circumstances or malfunctions in system.
8. Upon game completion, Game Server (N10) disconnects all participants from closed game "and session".
9. Return to step 1 for new game.

Overview of Tournament MODIFIED POKER

The following is a description of the basic situations or game setups that apply to the MODIFIED POKER Tournament game:
a) Adult Bar Game Tournaments—skill game for points or prizes (see Casino Tournaments below for payoffs).
b) Casino Tournaments—One to three session tournaments, played for large jackpots. The first session can be a qualifying round of ten to twenty deals. The same ten to twenty deals are provided for all participants. That is, all players are offered the same pair of cards for each deal to choose one card for each hand. The semi-finals and the finals will also consist of ten to twenty deals. The semi-final and final sessions should generally be used in large tournaments only to generate additional excitement since there will be a large jackpot.

Any number of players can enter the tournament. If the tournament is large enough, then some percent of the players may qualify for the semi-finals or finals. All prizes come from the jackpot entry bets made by the players. The house can also take a cut or fee for running the tournament. For example, the tournament payoff schedule could look like this:

Large Tournaments (more than 100)
 8th place gets 2% of jackpot
 7th place gets 3%
 6th place gets 4%
 5th place gets 5%
 4th place gets 8%
 3rd place gets 12%
 2nd place gets 16%
 1st place gets 40%
Smaller Tournaments
 4th place gets 10% of jackpot
 3rd place gets 15% of jackpot
 2nd place gets 25% of jackpot
 1st place gets 50% of jackpot
Very Small Tournaments
 2nd place gets 30% of jackpot
 1st place gets 60% of jackpot
 house gets 10% for running tournament The tournament would be run on normal Pick 'Em Poker machines/game stations which are arranged in a network, and described above in detail. Each participant in the tournament may optionally play stand-alone MODIFIED Poker simultaneously as a slot-like game for any stakes/denomination at all, including nickels, dimes, quarters, half-dollars, dollars, five dollars, or whatever denomination the game operator selects. Of course, it is not required that the player play the stand-alone game simultaneously with the tournament game.

Therefore, each participant can bet any number of units on any of the twenty games in the stand-alone environment within the tournament since the participants are not being judged by how much they win in absolute numbers of dollars, but how well they do on an individual hand as compared to everyone else in the tournament. Each of the individual hands are scored based on a combination of the single unit bet column of the payoff table and on duplicate match point bridge scoring rules.

For example, consider duplicate match point bridge scoring concepts. That is, two points are awarded for each player that is beaten, and one point for each player that is tied. Therefore, on where everyone is pulling a pair of Kings, someone can get a top score by getting triple-threes. Example: (K-3) (10-3) (K-7) (8-3) (3-5) yields a pair of Kings for almost all players except for the "crazy" few who pick the first 3-card!

This method of scoring is perfect for the Pick 'Em Poker tournament since there will be a great variation in the final five cards of each player. Remember that the same five pairs of cards offer thirty-two possible outcomes as the final hand.

Scoring Example and Analysis

Consider this deal: (♥K, ♦J) (♠K, ♦10) (♦8, ♣9) (♦9, ♣3) (♥3, ♣7) with 50 participants in a tournament the frequency of some possible final hands are:

| | | | | | | |
|---|---|---|---|---|---|---|
| (1) ♥K | ♠K | ♣9 | ♦9 | ♣7 | frequency of occurrence | 35 |
| (2) ♥K | ♠K | ♦8 | ♣3 | ♥3 | frequency of occurrence | 8 |
| (3) ♥K | ♠K | ♦8 | ♦9 | ♣7 | frequency of occurrence | 3 |
| (4) ♦J | ♦10 | ♦8 | ♦9 | ♣7 | frequency of occurrence | 3 |
| (5) ♦J | ♦10 | ♣9 | ♦9 | ♣7 | frequency of occurrence | 1 |

Scoring analysis:
 The 35 players with hand (1) tie 42 players and beat 4 players=(42×1)+8=50 points
 The 8 players with hand (2) tie 42 players and beat 4 players=(42×1)+8=50 points
 The 3 players with hand (3) tie 2 players and beat 1 player=(2×1)+2=4 points
 The 3 players with hand (4) tie 2 players and beat 47 players=(2×1)+94=96 points
 The 1 player with hand (5) ties and beats no one=0 points.
 Hands (1) and (2) are equivalent as defined by the payoff table and this is the only measure on hand.

Tournament entry fees can be of any amount. That is, while some players are putting up ten dollars, other players can put up other amounts. In essence, what is occurring is that simultaneous tournaments are being run—with participants overlapping from one tournament to another.

For example, let us assume that one hundred players wish to participate in a multi-layered tournament—with the following distribution of tournament jackpot entry fees:

| | |
|---|---|
| 50 players at | $10 |
| 30 players at | $25 |
| 15 players at | $50 |
| 5 players at | $100 |

Therefore there will be four concurrent pots with:
  100 players at $10 each for a $1,000 pot (all players)
  50 players at $25 each for a $750 pot (30 players at $25, the 15 at $50, the 5 at $100)
  20 players at $25 each for a $500 pot (the 15 players at $50 and the 5 players at $100)
  5 players at $50 each for a $250 pot (the 5 players who put up $100) After x deals (where x=10 or 20, for example), each group is independently scored by the above method. That is, scoring is comparative to only those players within each group.

For example, a player who has put up $100 will be scored comparatively in the four separate groups. The player may not qualify within the largest group, but may find himself winning within a smaller higher level group. Essentially, this method provides separate pots because for the higher stakes pot only some of the players are "all in," and a separate pot applies for all those players who are not "all in" the previous pot but who have entered the tournament.

Summary of Features of Tournament:
a) There is no restriction to the number of participants.
b) In addition, the number of participants does not have to be "a magic number", such as 64 or 128 or . . .
c) The participants can be playing at a machine of any denomination, since scoring is based not on absolute winnings, but, relative winnings to the payoff table. Therefore, a tournament can have a mixture of denominational participants.
d) The participants do not have to put up equivalent entry fees since the tournament software will divide the field into independently scored groupings. This will appeal to high-rollers who would normally never consider participating in this type of gaming.
e) The participants will actually win the full value of any hand that they create, at their individual machine. Thereby giving this tournament the best of both worlds—a duplicate bridge flavor for fairness and a rubber bridge flavor for full value winning.
f) The tournament consists of many deals giving the participants full value for their entry fee.
g) The tournament goes from start to completion in just a few minutes, giving the players the action they want.
h) The prize money is large, that is, the return on investment is high.
i) The game itself is the underlying reason why this type of tournament succeeds. It has a natural bifurcation of hands that can be created, which will quickly separate the field, by the scoring method used.

Special features of MODIFIED POKER Tournament:
a) Since this is a duplicate concept—the decision on each pair of cards must be completed by all participants PRIOR TO EXPOSING THE NEXT PAIR. That is, to avoid any possibility of collusion or cheating, all players must be on the same timetable. No one can see the next pair before all players make their decision on the current pair. THEREFORE, A TIME CONCEPT MUST BE USED, WHEREBY A PLAYER MUST MOVE WITHIN A TIME LIMIT OR THE MOVE WILL BE MADE FROM HIM—BY THE MACHINE.
b) The scoring and other "group" statistics can be maintained and displayed on-line, on-screen at all times. Therefore, the player knows his relative position within each group he is in and how many players are in that group and, of course, how much money can be won in that group.
c) Although the machine may be set up for a specific denomination—hopperwise, it must be capable of accepting through a bill acceptor, any denominations up to $100.
d) Payoffs will probably be credits, except first prizes which may be distributed by other means.
e) Accounting methods must allow for intracasino or intercasino play. (Substitute bar or other establishment for casino in the previous sentence.)
f) Office Tournaments—team play, that is, office section vs. another section. Also individual statistics.
g) Home Play Tournaments—keep score.

Description of Variants of MODIFIED POKER Tournament
a) Splitting: Instead of choosing one card of the pair being offered—the player can split his hand by doubling his bet, and therefore, taking both cards as part of two different poker hands. For example, if the player has reached a three card hold of (♠K, ♠Q, ♠J) and the offered pair is (♣10 or ♦K), then it would behoove the player to split and double his bet to have both possible hands, that is:
 (♠K, ♠Q, ♠J, ♣10) and (♠K, ♠Q, ♠J, ♦K) since each hand can be a winner.

Subsequent card pairs may offer no option, and the card chosen must go to both hands, or alternatively, the card pair may be split and one card used for each hand. For example, in the above example, if the four of clubs is chosen, then the player ends up with a flush in one hand and a pair of kings in the other.

Of course, there must be a premium to pay for this privilege since the player can be a guaranteed winner. One suggestion is, that to have the right to split requires the payment of an extra unit before any of the cards are dealt. For example, if the player plays six units (five units are the bet and one unit is for the opportunity to split) he can split by wagering an additional five units. All payoffs use the normal table. If the split option is not used, the unit is lost since it is not part of the player's wager. That is, if the player wins a payoff, the unit used for the split option is not considered in choosing the payoff column.

If the extra payment concept is used for splitting, that same payment concept can also allow for passing or taking both cards or replacement. (See options below.) That is, the extra unit bet may allow a player ONE OPTIONAL PLAY PER GAME.

b) Passing Option allows the player to Pass Up the pair offered and in effect get to see six pairs of cards to choose the five cards of a poker hand. For example, if the player's holding after three cards is (♠10, ♠9, ♠8) and the offered pair is (♣3, ♥2), the Pass Option allows the player to Pass on the Offered Pair and see another Offered Pair in order to choose the fourth card of the hand.

c) Take Both Cards Option allows the player to Take Both Cards of the Pair Offered and in effect get to see only four pairs of cards to choose the five cards of a poker hand. This option is not available as a fifth card option. For example, if the player's holding after three cards is (♣9, ♠9, ♣6) and the offered pair is (♠9, ♥6), the Both Card Option allows the player to have both cards offered to complete a full-house and not be offered a fifth pair to choose from.

d) Replacement Option allows the player to replace a card in the hand with a card from the offered pair, and in effect, get to see six pairs of cards to choose the five cards of a poker hand. For example, if a player's hand after three cards is (♠K, ♥7, ♣J) and the offered pair is (♣10, ♦Q) with the Replacement Option the player can choose to replace the ♥7 with the ♦Q, thereby holding (♠K, ♦Q, ♣J) and having two more pairs of cards to choose from.

Computer Process for MODIFIED POKER Tournament

The following is a description of the play game routine for MODIFIED POKER tournament version. One form of software that may be used to implement the MODIFIED POKER tournament is found in co-pending patent application, entitled INTERACTIVE GAMBLING CASINO SYSTEM to Howard M. Marks et al. filed on Feb. 13, 1996, serial number 60/011,574, the details of which are incorporated herein by reference. Alternatively, the specific software used to implement this tournament version is included in the Appendix of copending provisional patent application, entitled MODIFIED POKER TOURNAMENT GAME AND INTERACTIVE NETWORK COMPUTER SYSTEM FOR IMPLEMENTING SAME to Anthony M. Singer, et al., filed on filed Jun. 14, 1996, serial number 60/019,747, the details of which are incorporated herein by reference.

The software in the referenced Appendix is designed to handle or interact with the specific screen displays illustrated in FIGS. 19–29, described in detail below. FIGS. 13–18 are flowcharts of the computer implemented process provided by the software in the referenced Appendix for the network casino environment in provisional patent application Ser. No. 60/019,747, incorporated herein by reference.

Figure 13:
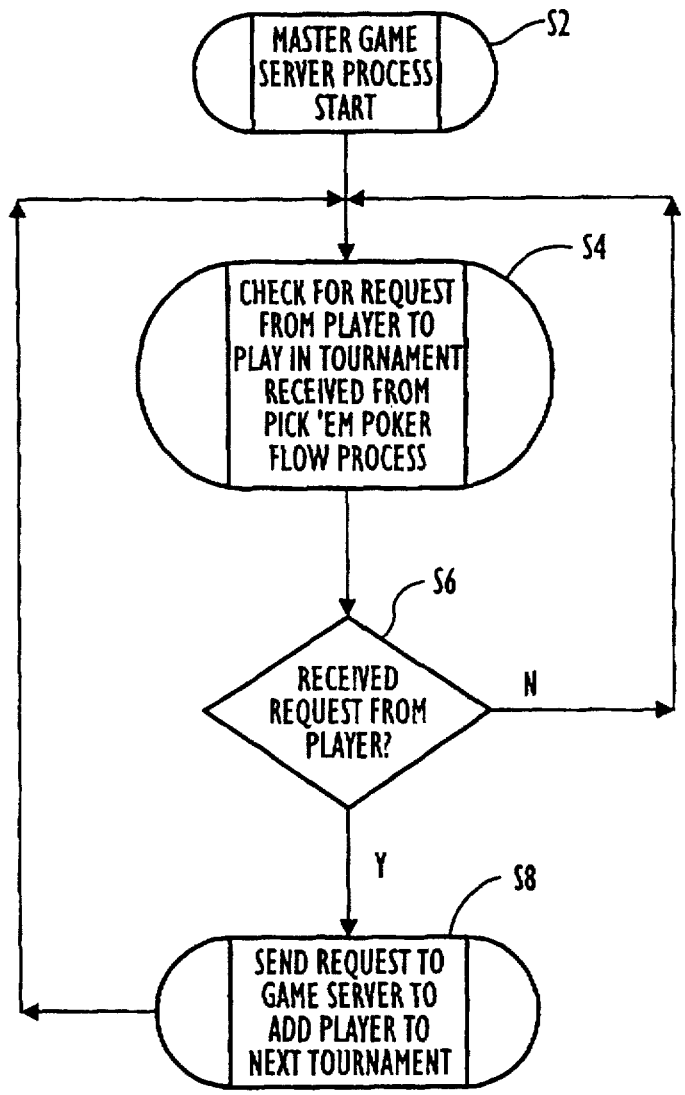
FIGS. 13-18 are flowcharts of the computer implemented process for the tournament network casino processes.

In FIGS. 13–18, the computer implemented process for the MODIFIED POKER game coordinates and implements the game for individual users as well as users in a tournament type competition. FIG. 13 is a flow chart of the master game server process in the MODIFIED POKER game system which begins at Step S2. The master game server process, via the master game server computer N5, checks in Step S4 for requests from players to play in a MODIFIED POKER tournament game which is received from a MODIFIED POKER process flow described in detail in FIGS. 16–18. Master game server computer N5 then determines whether or not the request from a player has been received to join a tournament in Step S6.

If no request has been received from a player, then the master game server computer N5 continues to monitor the presence of such a request that is received from the MODIFIED POKER process flow and game station computer N20.

Figure 14:
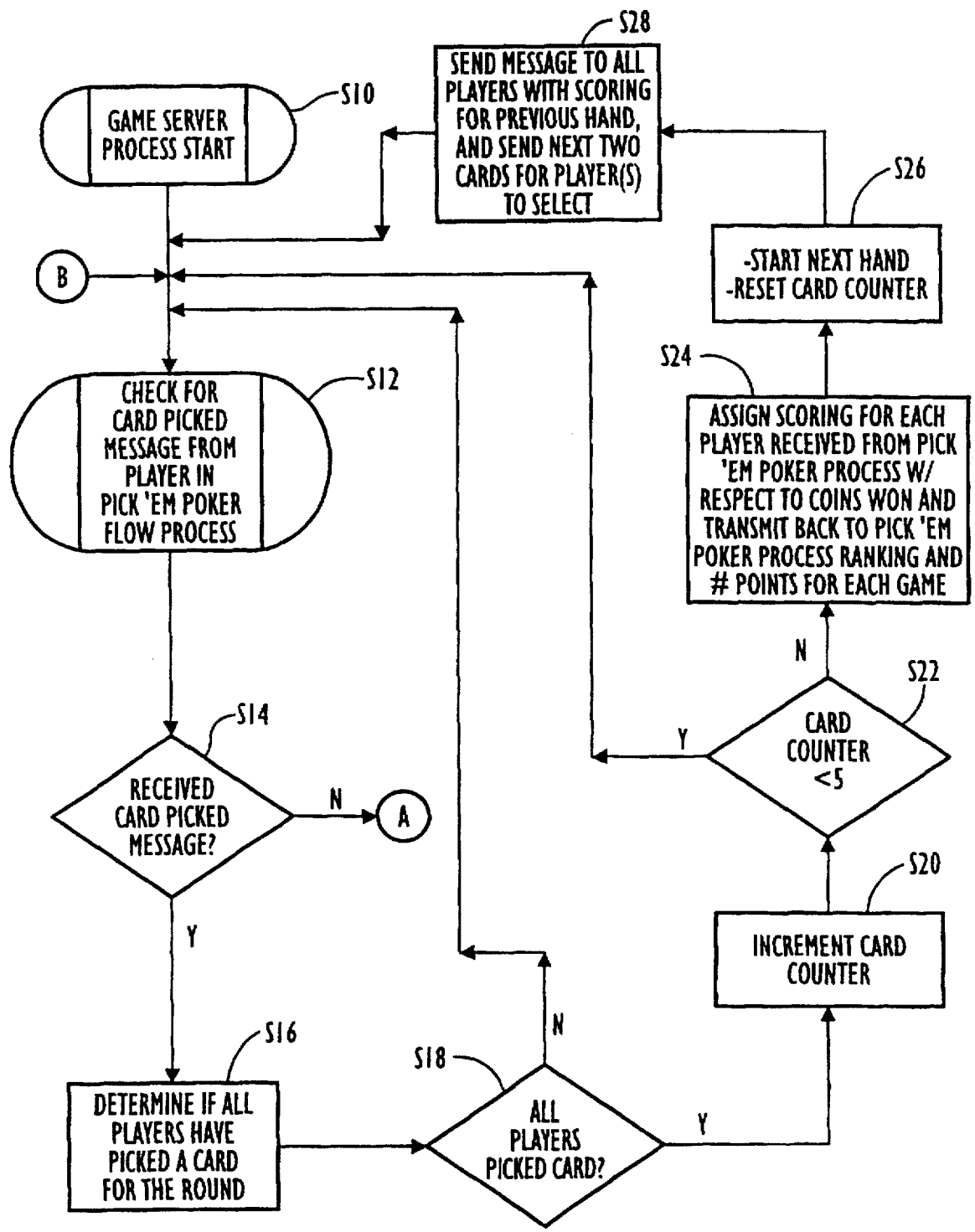
Figure 15:
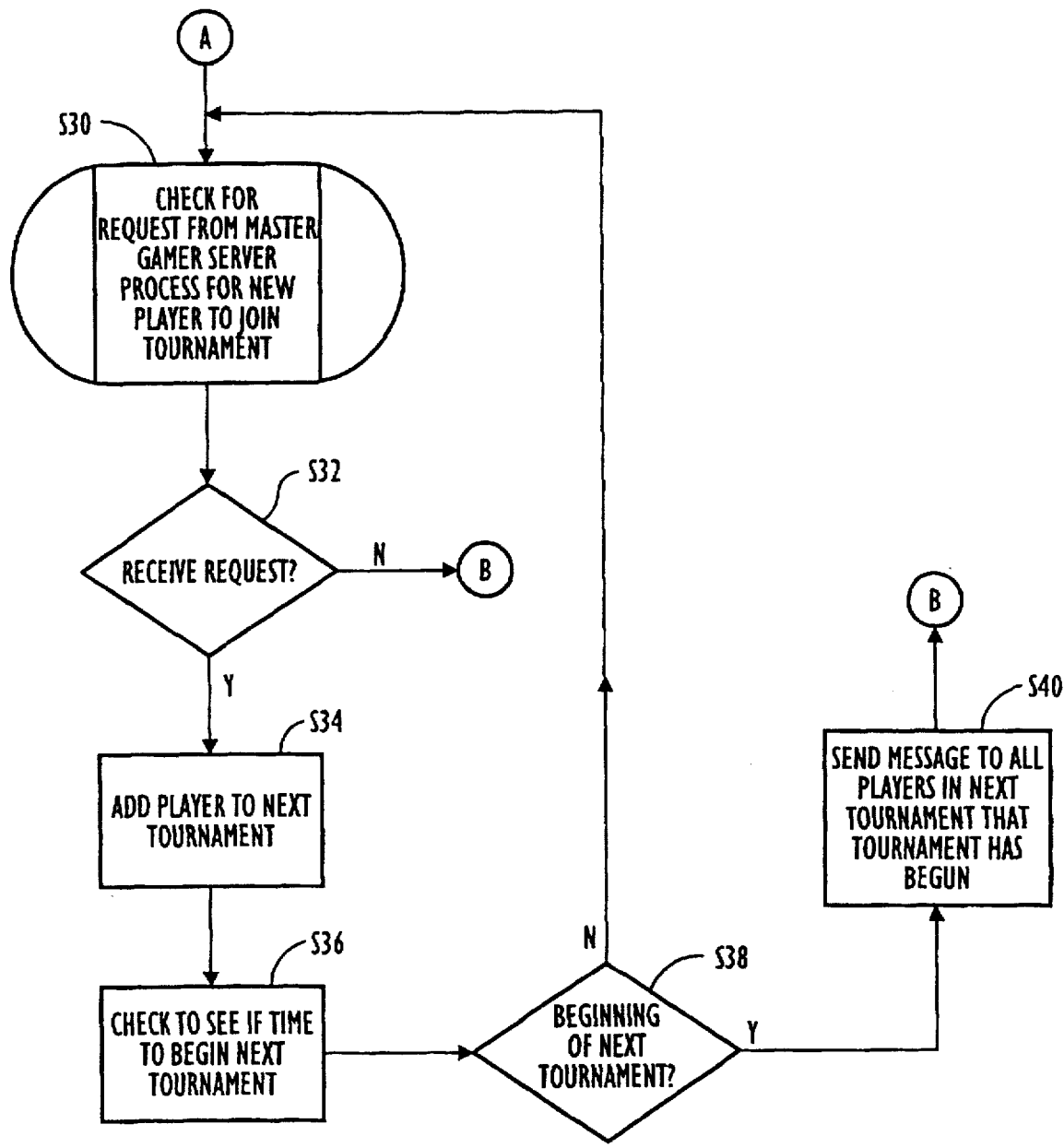

If the master game server computer N5 determines that a request has been received from a player to join the MODIFIED POKER tournament in Step S6, the master game server computer N5 sends, in Step S8, a request to the game server computer N10 to add this player to the next tournament by sending such a request to the game server process flow which is described in detail in FIGS. 14–15. After sending the request to the game server computer N10, the master game server computer N5 then returns the flow of the master game server process back to Step S4 where the master game server N5 checks for a request from another player to join the MODIFIED POKER tournament.

FIGS. 14–15 are flow charts of the computer implemented process for the game server process utilized by the game server computer N10. In FIG. 14, the game server process starts at Step S10. The game server computer N10 checks or determines whether the card picked message has been received from the player via the MODIFIED POKER process in Step S12. The game server computer N10 accomplishes this function by interfacing with the game station computers N20 which are implementing or running the MODIFIED POKER process flow, i.e., the basic game process for the MODIFIED POKER game. Game server N10 then determines whether the card picked message has been received from the MODIFIED POKER process in Step S14, and if so, determines if all players have picked a card for the current round of the MODIFIED POKER game in Step S16.

Game server computer N10 then determines whether all players have picked a card in Step S18, and if not, continues to monitor the situation until all players have picked a card for the current round of play. If game server computer N10 determines that all players have picked a card in Step S18, then the game server computer N10 increments a card counter in Step S20 and then determines whether the card counter is less than the total number of rounds which are to be played for the MODIFIED POKER game. In the average situation, there will be five rounds of cards dealt for the MODIFIED POKER game. However, any number of rounds is possible. For example, seven card stud could be implemented in seven rounds of play or more.

If all the rounds have not been dealt to the players as determined in Step S22, then the control of the game server process continues to monitor the MODIFIED POKER game for cards picked by the player for the additional or remaining rounds of play until all rounds have been completed. If, however, all rounds have been dealt to the players which is determined in Step S22 by the game server computer N10, then the game server computer N10 assigns scoring for each player that has played the MODIFIED POKER game via the MODIFIED POKER process. The game server computer N10 assigns a specific number of coins or points that have been won by each player for tournament purposes.

The game server computer N10 then transmits back to the MODIFIED POKER process a ranking and number of points for each game which is applicable for the tournament competition in Step S24. The game server computer N10 next prepares to start the next MODIFIED POKER hand for the next tournament, and also resets the card counter in Step S26. The game server computer N10 also sends a message to all players of the tournaments with the scores/points for the completed hands in the tournament in Step S28. The game server computer N10 also sends the next two cards for the first round of the next hand in the MODIFIED POKER tournament for the players to select in Step S28, assuming all hands have not been played in the tournament. Control of the game server process flow is then returned to the beginning of the game server process to continue the monitoring and administering of each of the individual rounds for the MODIFIED POKER process.

If the game server computer N10 does not receive a card pick message in Step S14, then the game server computer checks or requests from the master game server process and master game server computer N5 to determine whether a new player wants to join the tournament in Step S30. If no request is received from the master game server computer N5 to add a new player to the tournament in Step S32, then control reverts back to the beginning of the game server process. On the other hand, if a request is received from the master game server computer N5 to add a player in Step S32, then the game server computer N10 adds a player to the next tournament in Step S34, and also checks to see if it is time to begin the next tournament in Step S36.

If it is not time to begin the next tournament which is determined by the game server computer N10 in Step S38, the control of the game server process reverts to Step S30 where the game server computer N10 checks for requests received from the master game server computer N5 for adding a new player to the tournament. If it is time to begin the next tournament as determined by the game server computer N10 in Step S38, then the game server computer N10 sends a message to all players that have now joined this current tournament that the tournament is now beginning at Step S40. Control for the game server process flow is then returned to the beginning of the process so that the game server computer N10 continuously monitors when the next tournament is forming and coordinates and/or administers the formation of the next tournament.

Figure 16:
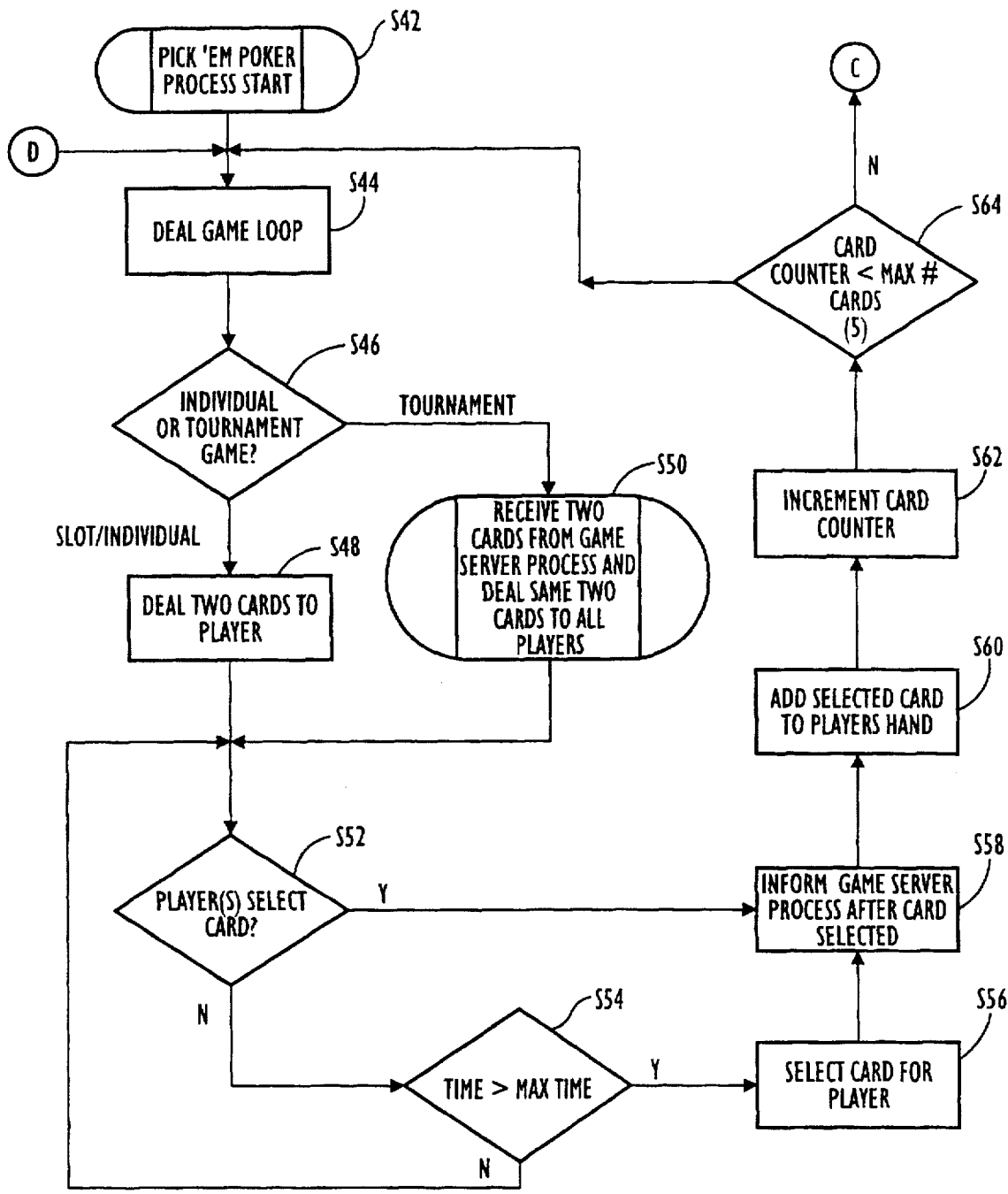
Figure 17:
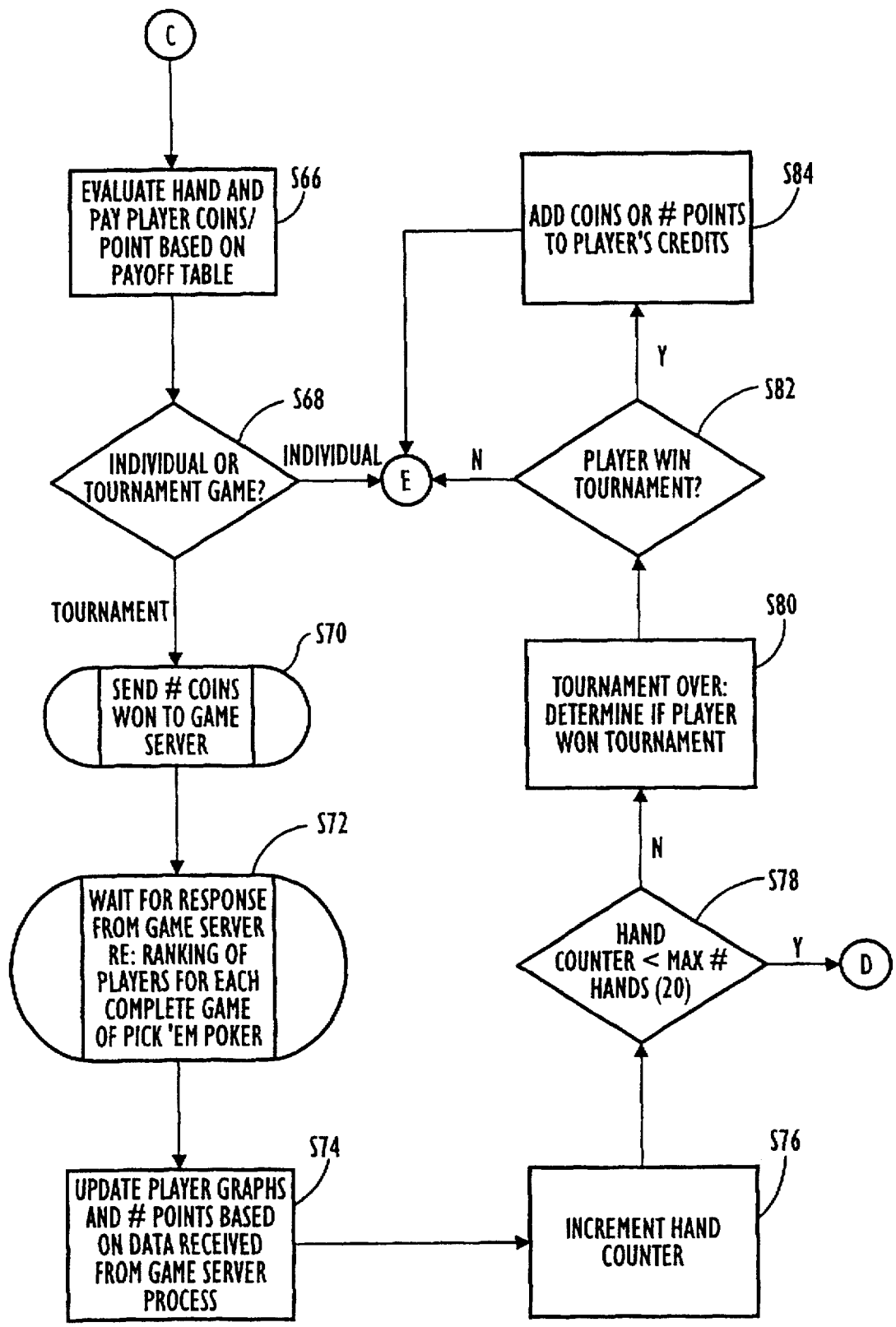
Figure 18:
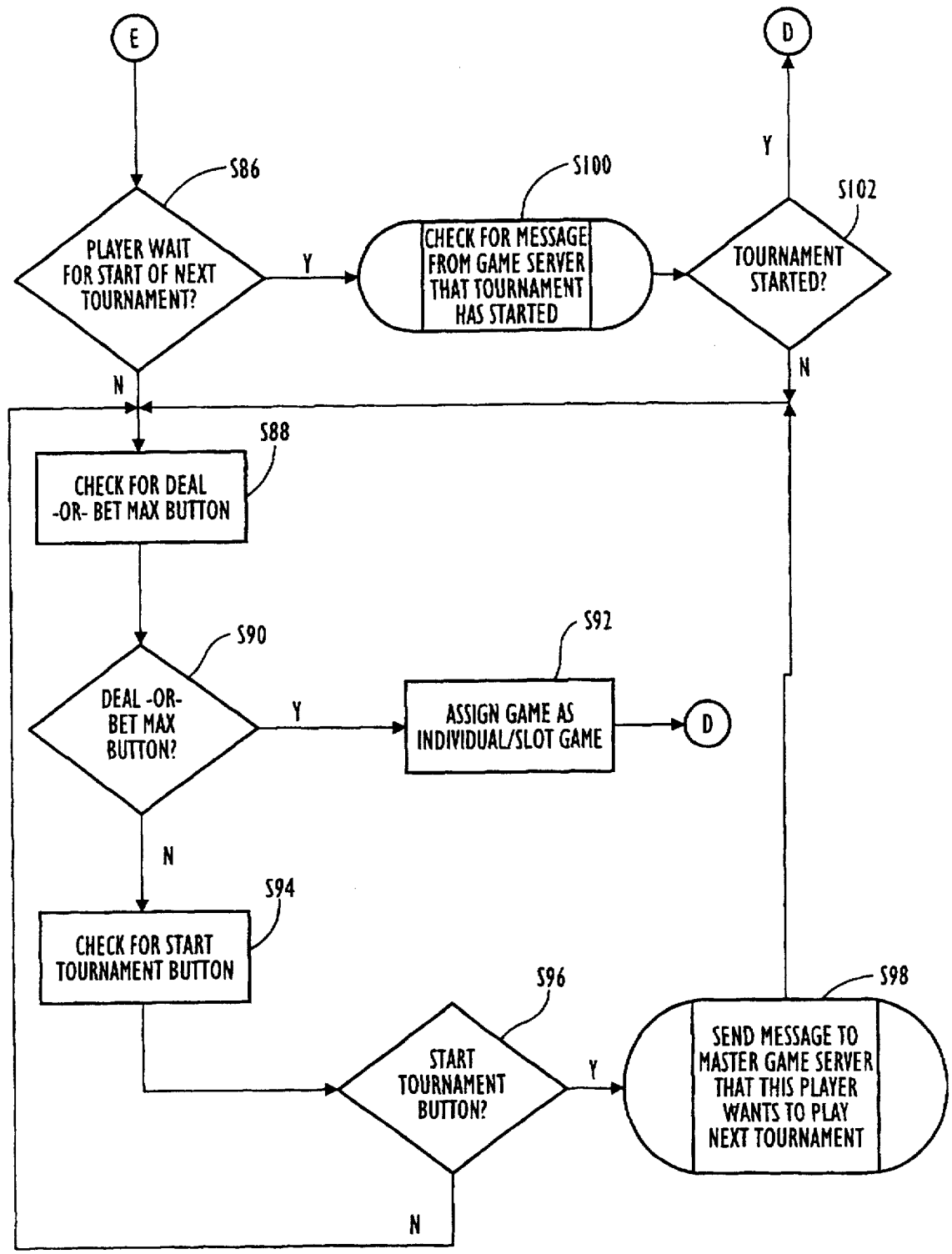

FIGS. 16-18 are flow charts of the MODIFIED POKER process which is implemented by the individual game stations N20. In FIGS. 16-18, the MODIFIED POKER process begins at Step S42. The game server station N20 then begins the process of dealing the next MODIFIED POKER cards in Step S44. Prior to actually dealing the cards for each round of the MODIFIED POKER game, the game station N20 determines whether a normal game of MODIFIED POKER is desired (i.e., a slot game where the player is playing against the house or game station computer N20) or whether the player has requested to be part of a MODIFIED POKER tournament game in Step S46.

If the player has requested to be part of a regular MODIFIED POKER game and requested to play against the house, then the game station N20 deals two cards to the player in Step S48 so that the player can select one of those cards to build the player's card hand. If on the other hand, a player has requested to be part of a tournament in Step S46, then game station N20 coordinates with the game server computer N10 to receive two cards from the game server N10 and deals the same (or possibly different) two cards to all players in the tournament in Step S50.

The game station computer N20 then determines whether all players have selected one of the two cards which has been dealt to them in Step S52, and if not, determines whether a predetermined period of time has been exceeded which has been allocated for the player to choose a card in Step S54. If the predetermined period of time has not been exceeded in Step S54, then game station computer N20 continues to monitor whether all players have picked a card from each hand dealt to them.

If the predetermined period of time has been exceeded in Step S54, then game station computer N20 will select a card for the player from the pair of cards that has been dealt to the player in Step S56. Game station computer N20 will inform the game server computer N10 after the card has been selected in Step S58 and add the selected card to the player's hand in Step S60. Game station computer N20 will also increment the card counter in Step S62 indicating that each of the players has accepted an additional card to build its hand. The game station computer then determines whether the card counter is less than a maximum number of cards which has been allocated for each player's hands in Step S64.

If the card counter is less than the maximum number of cards indicating that each of the players have not completed building their hands in Step S54, then control of the MODIFIED POKER process returns to the deal game loop in Step S44 to continue dealing additional cards to each player whether in the normal or tournament version of the MODIFIED POKER game. If the card counter is not less than the maximum number of cards, i.e., the player has been dealt all cards required to build his hand, in Step S64, then the game station computer N20 evaluates the complete hand which has been built by the player and pays the player the appropriate coins or points based on a predetermined pay-off table which is utilized to determine whether the player's hand is successful or not in Step S66. The game station computer N20 then determines whether or not the current game which is being played by the player is for the normal or tournament game in Step S68, and if it is a tournament game, game station computer N20 sends the number of coins that have been won by the player for this round of the MODIFIED POKER tournament to the game server computer N10 in Step S70.

The game station computer N20 then waits for a response from the game server computer N10 in Step S72. The response from the game server computer N10 involves the specific ranking of players for each complete game of MODIFIED POKER. That is, the game server computer N10 determines the appropriate ranking for all the players of the tournament as each round of the tournament progresses, until completion of the tournament.

Based upon the response from the game server computer N10, the game station computer N20 then updates the player graphs and number of points for the tournament's competition for each of the players based on the data that is received from the game server computer N10 in Step S74. The game station computer N20 then increments the hand counter S76, indicating that a round of play has been completed, and then determines whether the hand counter is less than the maximum number of hands in Step S78.

If the hand counter is less than the maximum number of hands in Step S78, then control of the MODIFIED POKER process reverts back to the beginning to the deal game loop/routine in Step S44 to prepare and execute the dealing of the next round or hand for the MODIFIED POKER tournament competition. If the hand counter is not less than the maximum number of hands, i.e., all hands in the tournament have been dealt to the players and have been completed, then the game station computer N20 determines that the tournament is over and also determines if the player has won the tournament based upon data that has been received from the game server computer N10 in Step S80.

If the game station computer N20 determines that the player has won the tournament in Step S82, then game station computer N20 adds coins/points to the player's credit in Step S84. After adding coins or points to player credit in Step S84, or if the player has not won the tournament in Step S82, the game station computer N20 determines whether the player is waiting for the start of the next tournament in Step S86. If the game station computer N20 determines that the player is not waiting for the start of the next tournament, then the game station computer N20 checks for the activation of the deal or bet max button in Step S88 and determines whether either of those buttons have been activated in Step S90.

If game station computer N20 determines that the deal or bet max button has been activated in Step S90, then game station computer N20 assigns the MODIFIED POKER game as a normal or slot game in Step S92, and reverts control to the beginning of the MODIFIED POKER process Step S42 for implementation or execution of a individual/slot game for the player. If game station computer N20 determines that the deal or bet max button has not been activated in Step S90, then the game station computer N20 checks for activation of the start tournament button in Step S94, and determines if the button has been activated in Step S96.

If the start tournament button has not been activated in Step S96, then the MODIFIED POKER process is reverted to Step S88 for continuously checking whether the player has decided to play the next game either as a tournament or slot/individual game. If game station computer N20 determines that the start tournament button has been depressed, then game station computer N20 sends a message to the master game server N5 that this player wants to play the next tournament in Step S98 and control then reverts back to Step S88 where game station computer N20 determines whether the deal or bet max button has been depressed or activated.

If the player has agreed to wait for the start of the next tournament as determined by game station computer N20 in Step S86, then game station computer N20 checks for a message from the game server computer N10 indicating that the tournament has started in Step S100. If the game station computer N20 determines that the tournament has not started in Step S102, then control reverts back to step S88 where the game station computer N20 determines whether the deal or bet max button has been depressed.

If the game station computer N20 determines that the tournament has started based upon the message received from the game server computer N10 in Step S102, then control of the MODIFIED POKER process is reverted back to the beginning of the process for dealing cards to each of the players that have been assigned to a particular tournament in Step S44.

Figure 19:
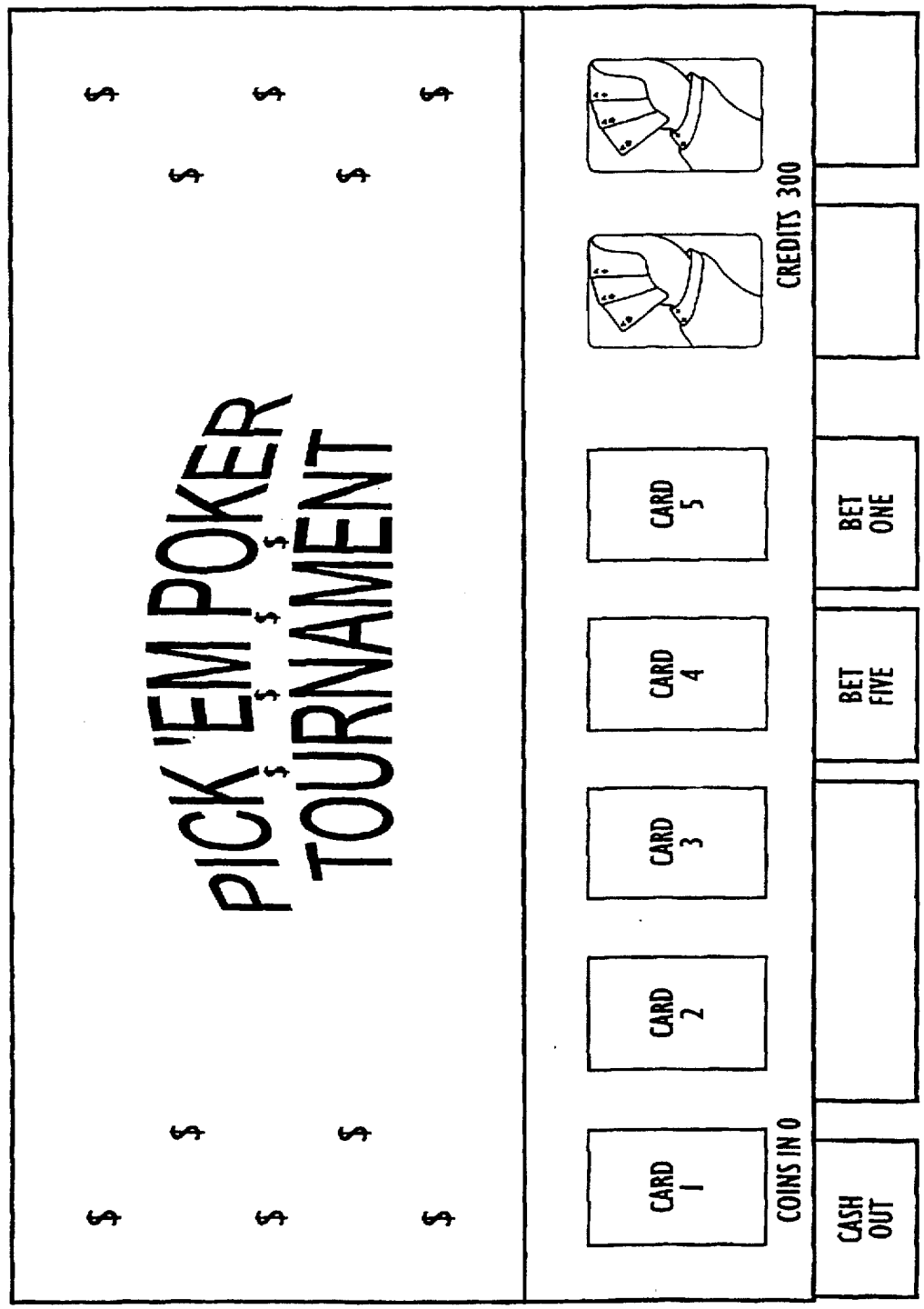
FIGS. 19-29 are screen displays utilized in the MODIFIED POKER tournament game.

FIGS. 19–29 are screen displays utilized in the MODIFIED POKER tournament game. The main screen for the MODIFIED POKER tournament game is illustrated in FIG. 19. The MODIFIED POKER tournament version begins with the person having, for example, 300 credits. After the player indicates a desire to play the tournament version, the next screen illustrated in FIG. 20 notifies the player that the tournament is forming and that the player must wait until a sufficient number of other players have requested the tournament MODIFIED POKER game.

After requesting to play the tournament game, and after a predetermined number of players have joined the tournament game, the computer process will instruct all of the registered players that the tournament has begun. The computer process will then send the first two playing cards to each and every computer. The two cards that are sent to all players are typically the same cards for fairness. Alternatively, the players may each be dealt different cards using some form of random sequence.

Figure 20:
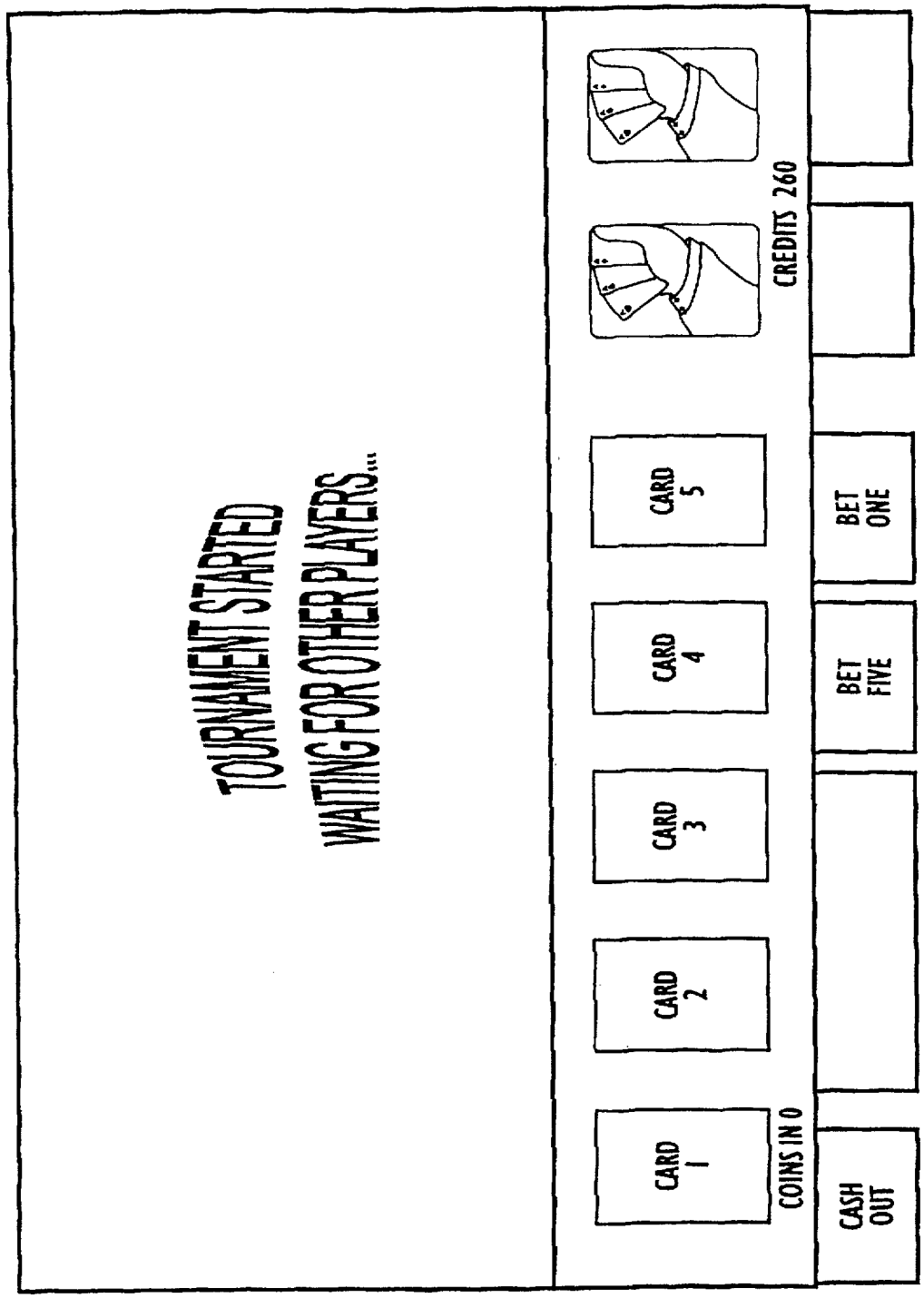
Figure 21:
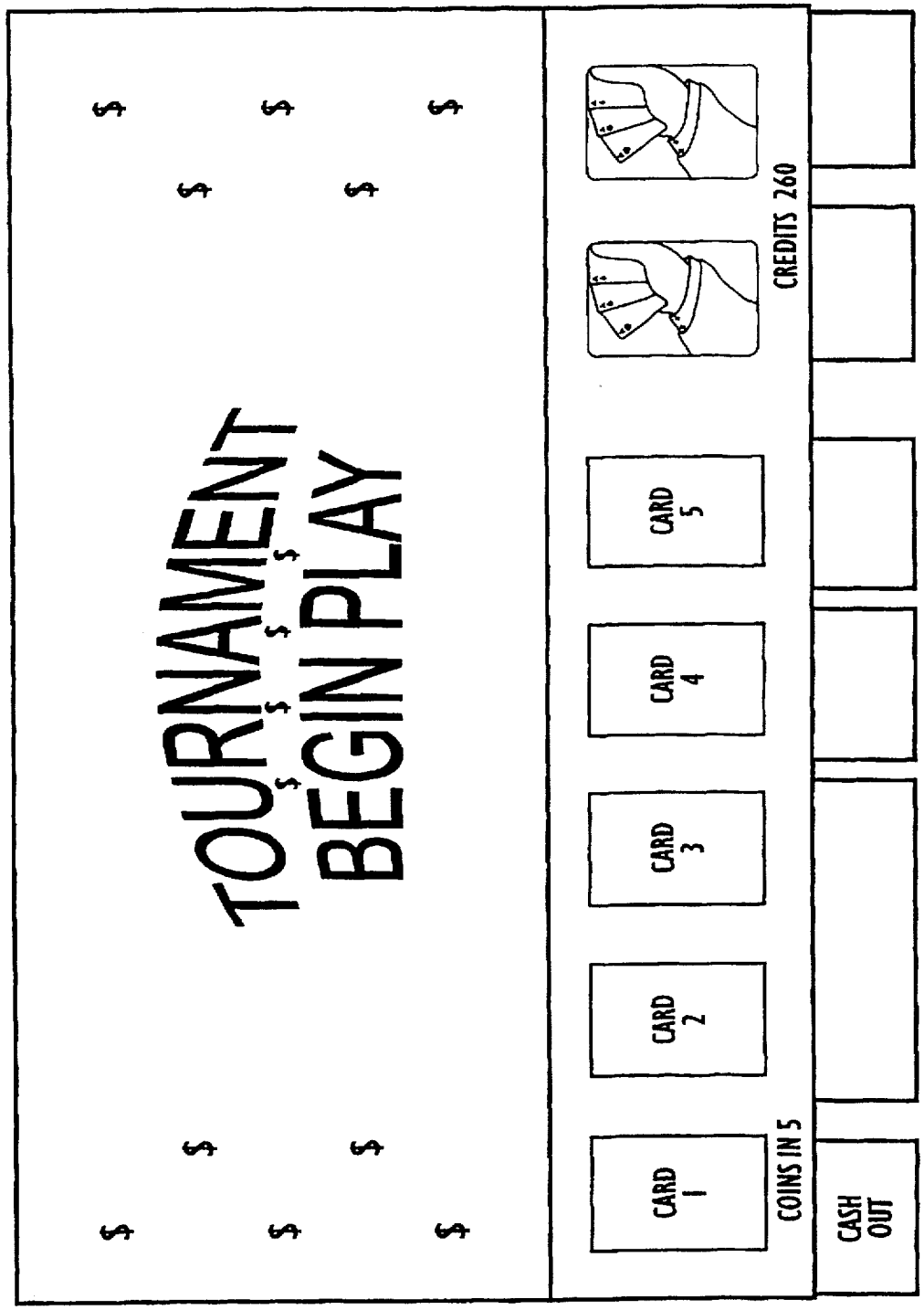

Referring to FIG. 20, the credits are at 260. It costs 40 credits to begin. We deducted 40 from the original 300, and at the same time, the coins in is 0. Which means that the player has not made the bet of 5. The bet for the individual slot game is anywhere between 1 and 5, but when playing in a competition/tournament, the player must bet the maximum which is 5 coins.

The tournament includes 20 games, and each game costs the player 5 coins per game as well as the 40 that was entered initially. So the 40 is an initiation fee, and its used toward the jackpot. The next screen (FIG. 21) shows "coins in 5" but for the credits—it still says 260. Once the player is dealt the first two cards, then the additional credits of 5 will be deducted resulting in a total credits of 255. For the individual/slot game, the player has a choice of changing from 1 to 5 coins/tokens, and the system waits until the player hits 5 and then hits deal.

Figure 22:
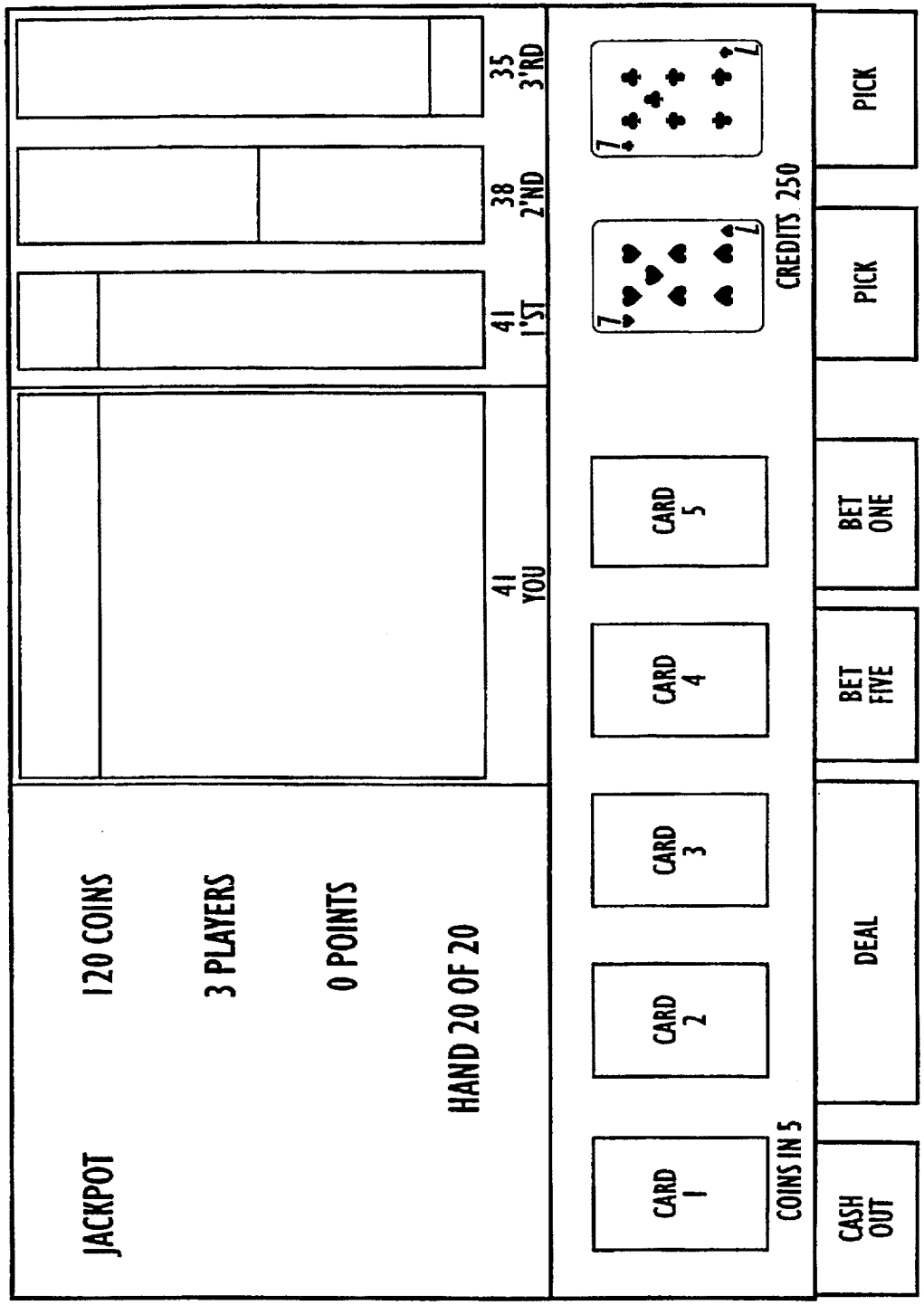
Figure 23:
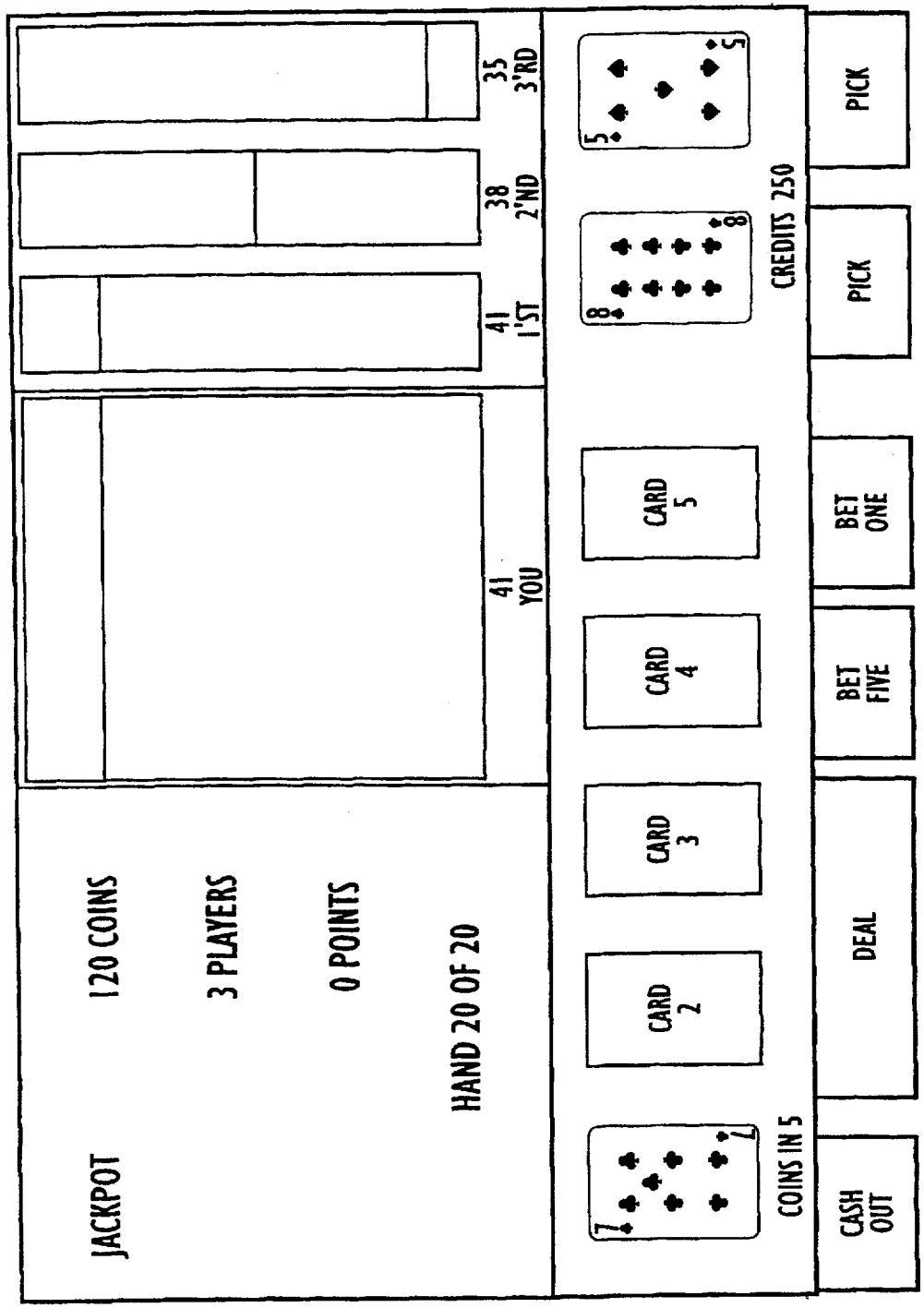
Figure 24:
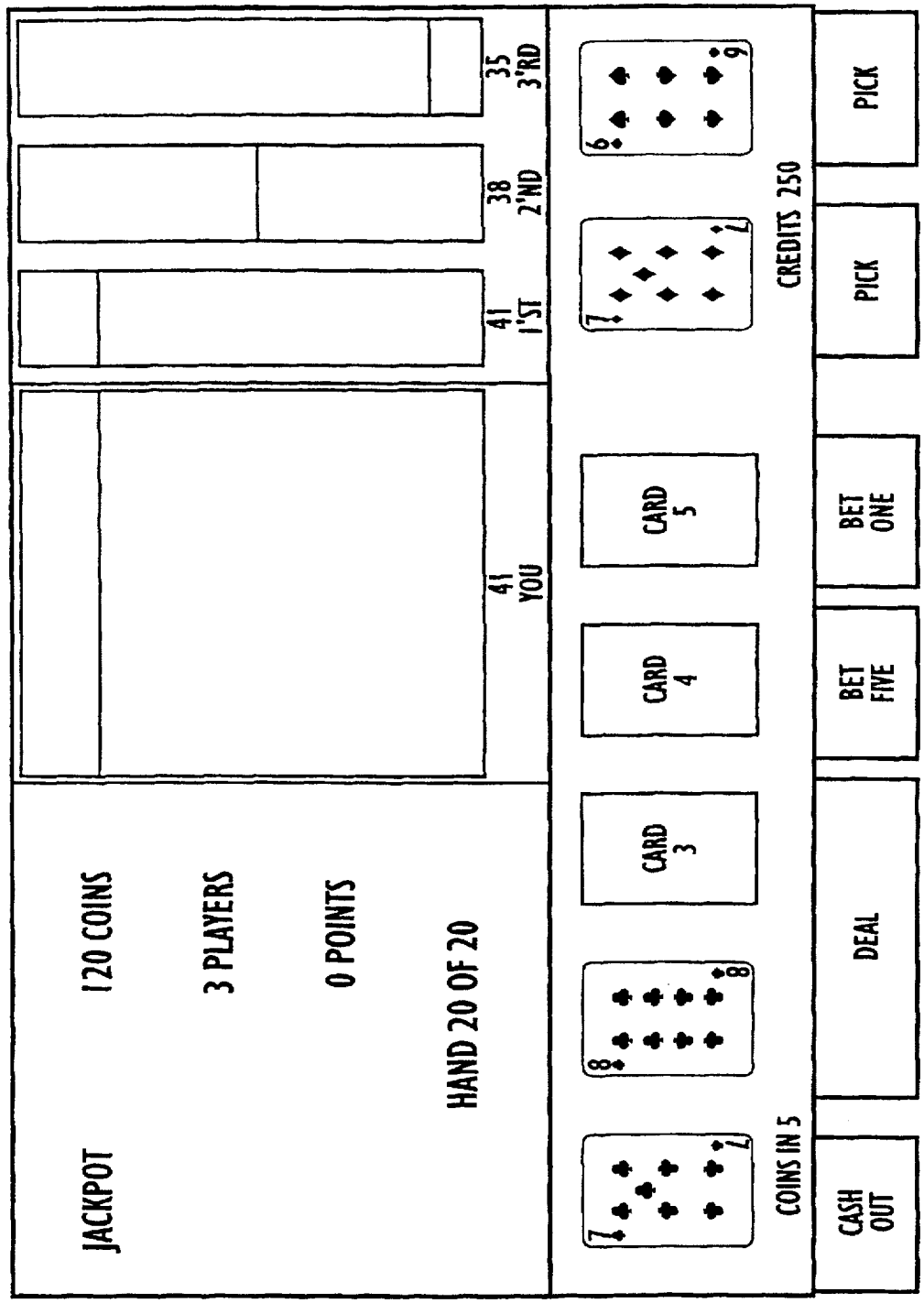
Figure 25:
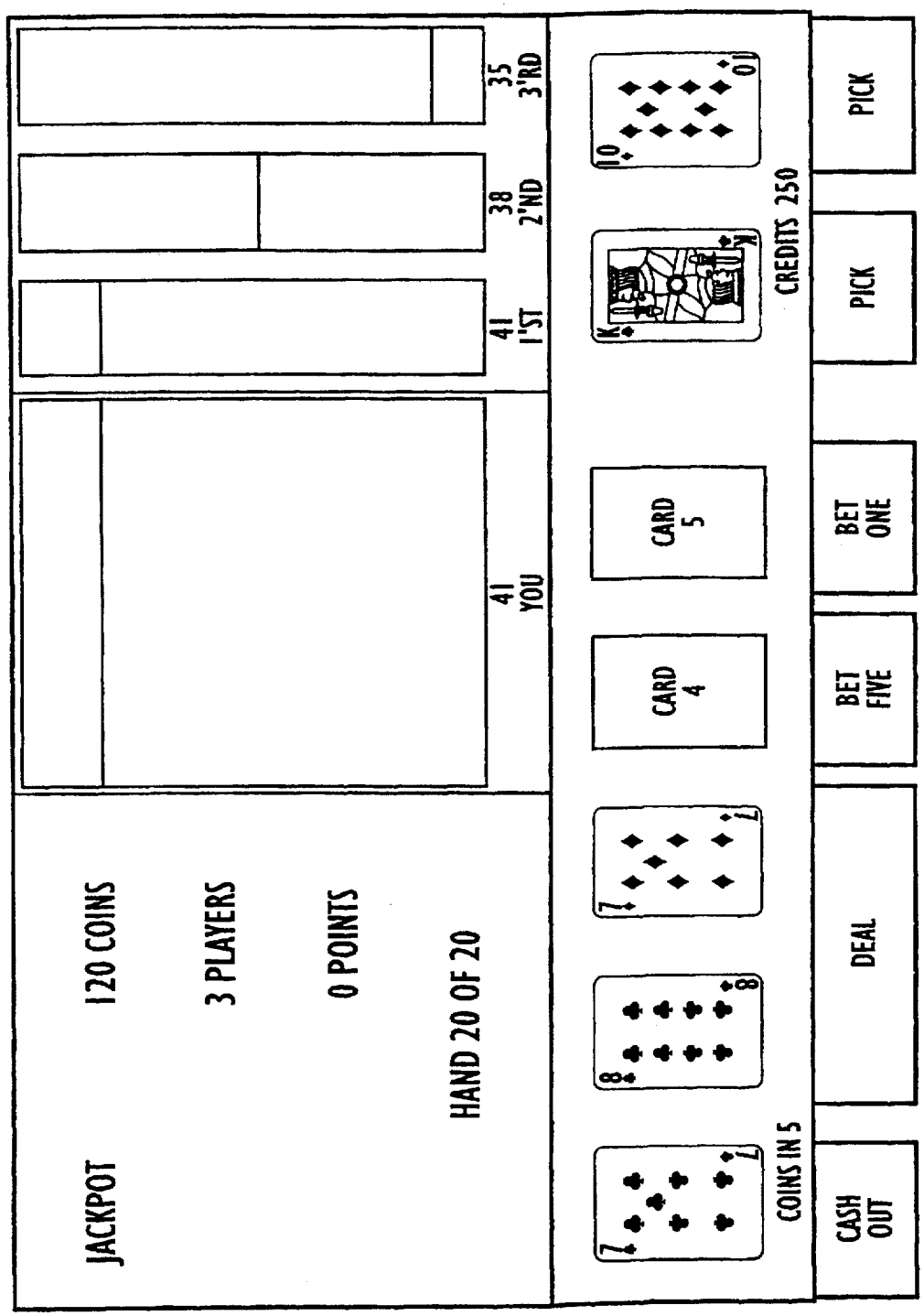
Figure 26:
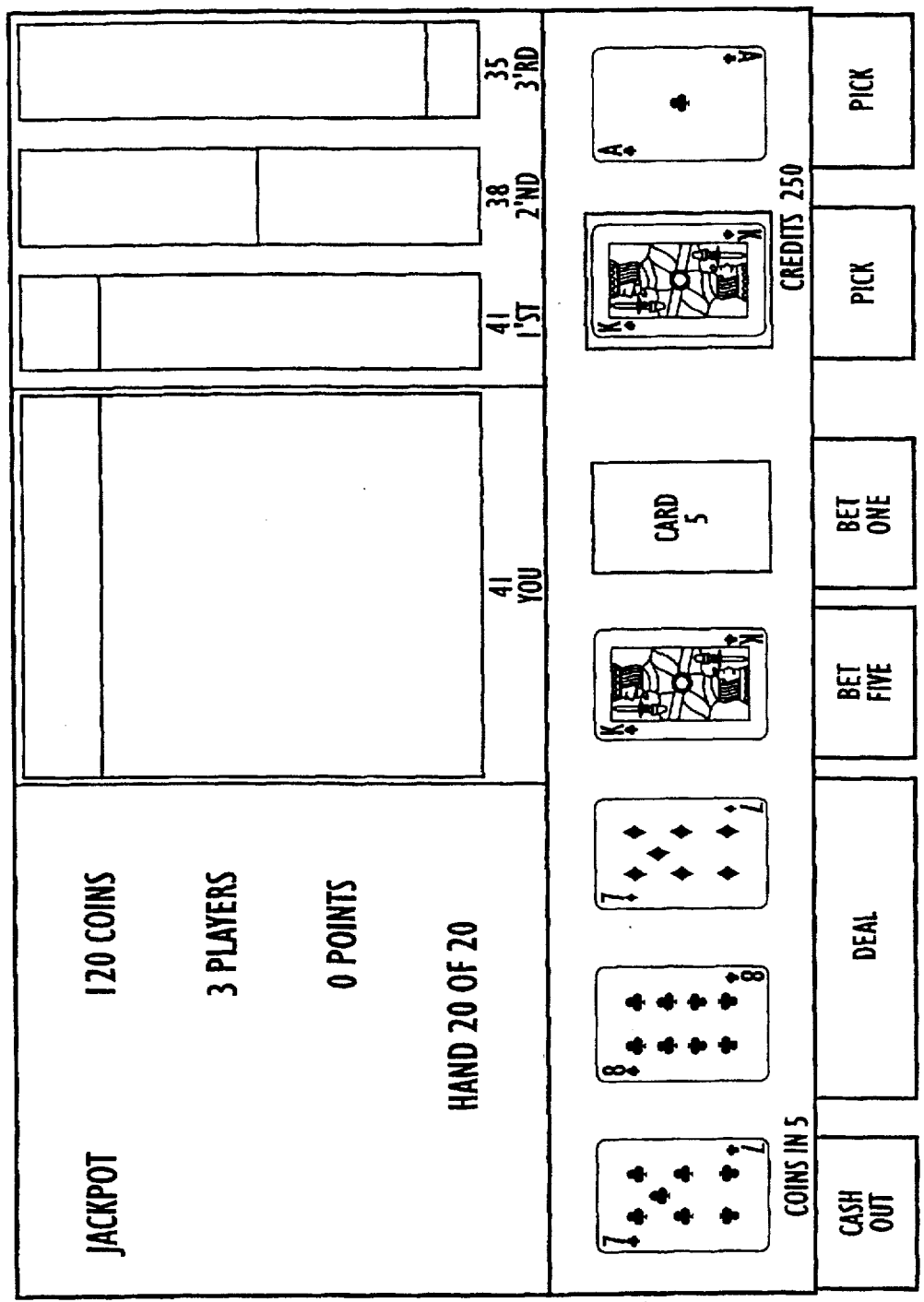

The next display (FIG. 22), illustrates the situation where the tournament is at hand 20 of 20. The last hand for the jackpot for the end of the competition is illustrated in FIG. 22. If a player wins, the player's credits will go up so the player can use the credits that have been gained for the winning hand in the slot version and apply those to the tournament. Its really going back into the player's coins or balance. Normally, the player is going to win during play. For example, while playing 20 games, the player might have 3 of a kind and get paid for that hand. Thus, the player may accumulate points/coins during the tournament.

FIG. 22 illustrates the number of players, and how many points have been awarded to each. For the player that is viewing this screen, FIG. 22 illustrates 0 points. If the player gets 0 points, it means that the player's hand was beaten by every other player. The big fat bar graph is the cumulative number of points for the player. In this case, the screen shows three separate bar graphs. That is, first place, second place, third place.

The first place player is shown in FIG. 22 with 41 points. There can be more than one player in first place. If there is more than one player in first, then the display will show first, second and third coming across as 41/41/41. The height of the player's color for scoring purposes is dependent upon whether the player is in the first, second or third place.

Figure 27:
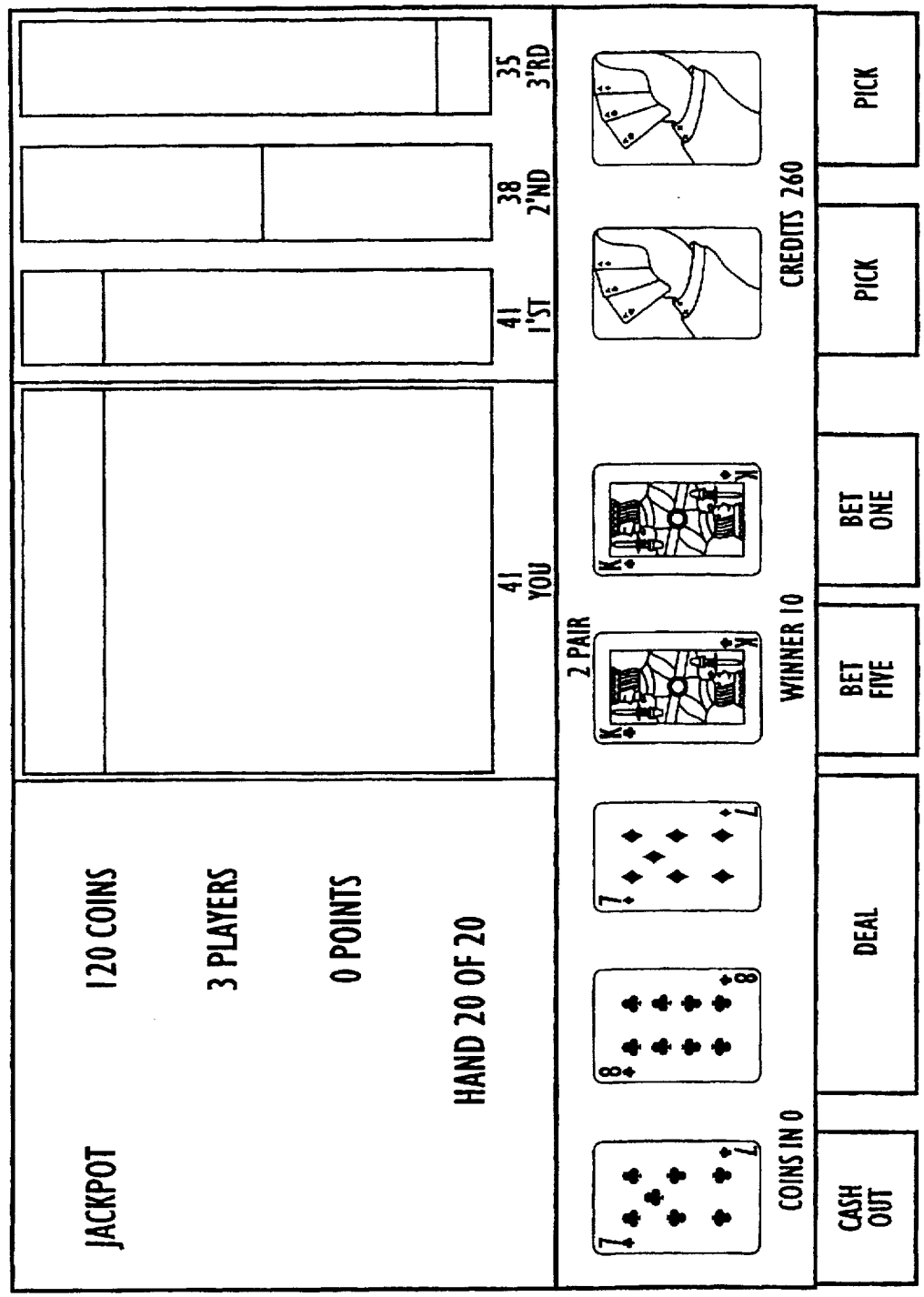

FIGS. 23–26 illustrate the progression of the MODIFIED POKER game. In FIG. 27, the last cards of the round have been dealt, and the player has two pairs, a pair of 7s and a pair of kings. At this point in time, there is a winner with 10 points being awarded for having two pairs. So the player credits have now been incremented from 250 to 260.

Figure 28:
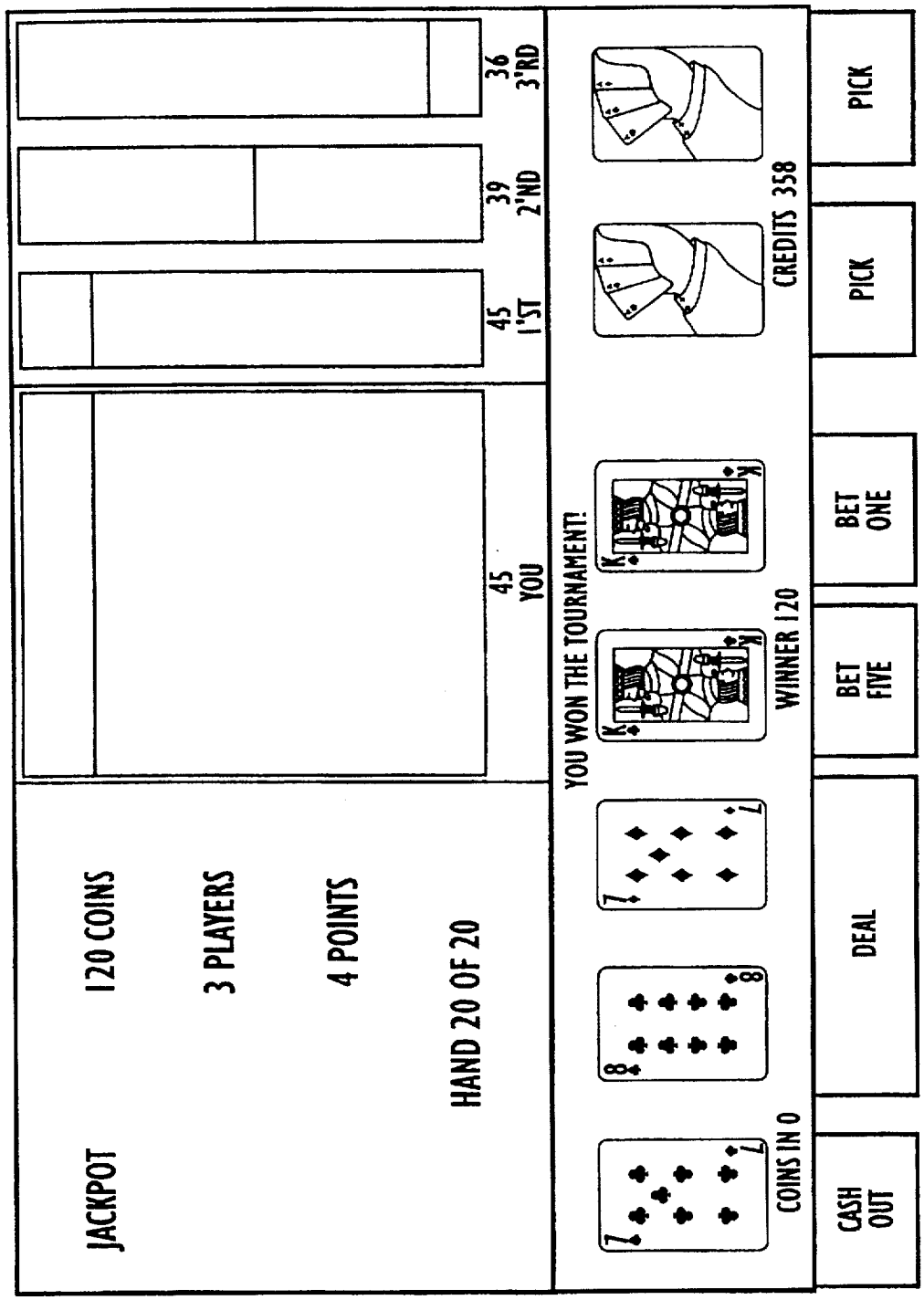
Figure 29:
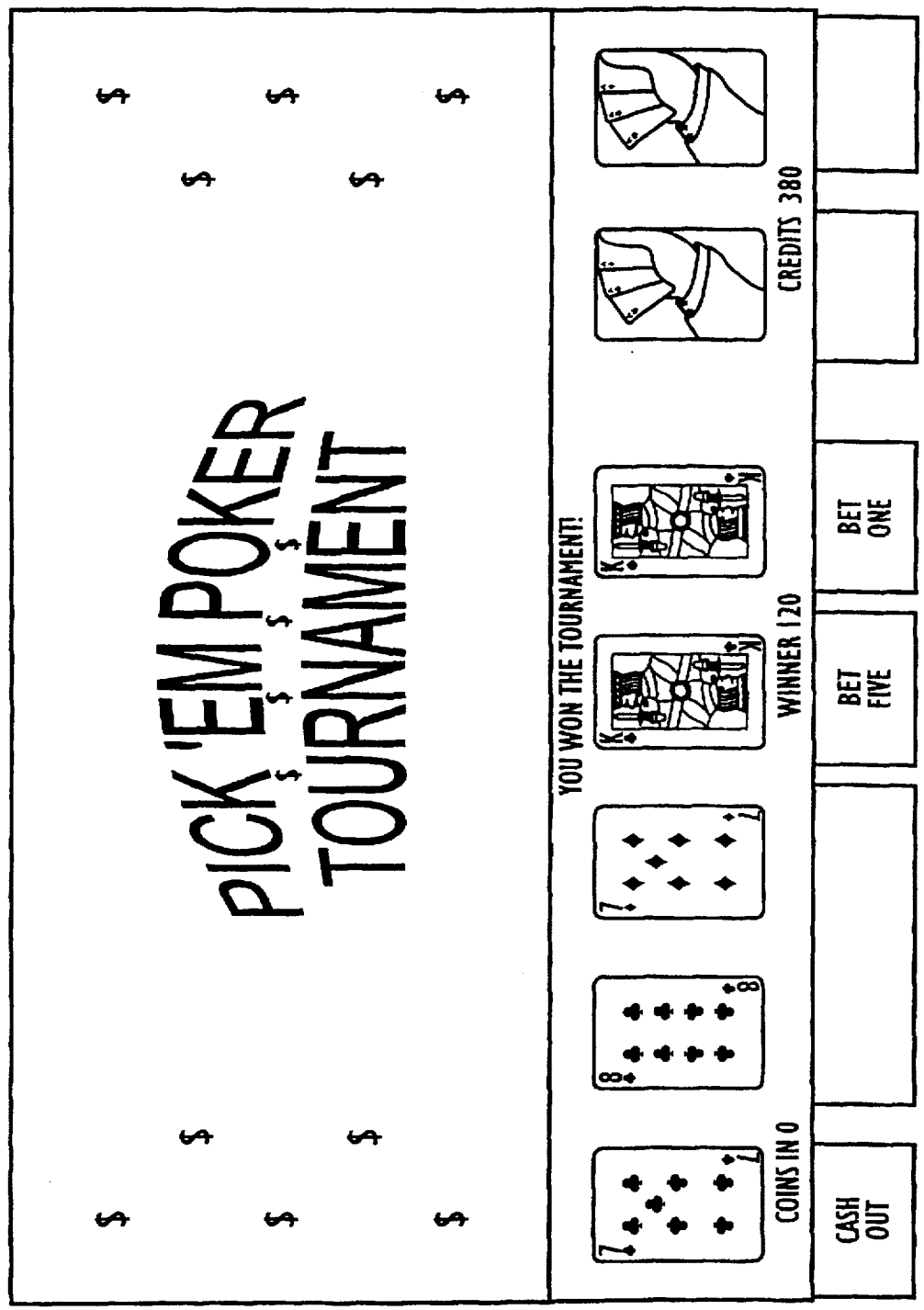

FIG. 28 illustrates when the overall tournament winner has been evaluated. In FIG. 28, the player in first place for the tournament has 45 points, and at that point in time, the player is awarded with 120 credits. FIG. 28 does not illustrate, however, when the player has been completely awarded all credits because the total credits should be 380 (and not 358 credits), i.e., 260 credits plus 120 awarded credits.

FIG. 28 was snapped or printed while the computer was adding up the points. That explains FIG. 29 where the final screen is illustrated with the credits being 380.

Thus, the above description illustrates the exciting aspects of the MODIFIED POKER game. It has the same feel as video poker, the same speed, same knowledge, and some of the same number of decisions. An example tournament situation is as follows: The player sits at a normal video poker machine which normally deals random cards. Because each machine is independent, there is no reason ever to think of doing otherwise. However, with the MODIFIED POKER tournament card put into the machine (e.g., slot machine), it now is capable of communicating to a central computer. That is, the game station N15 communicates with the gamer server computer N10 for the tournament competition. The master server computer N5 is also used to coordinate between the game station computer N15 and game server computer N10.

The central computer (game server computer N10), if the player elects to participate in the tournament, will send the player the same random hand that is being sent to all the other participants in the tournament. Each player must choose the card from the pair of cards being offered simultaneously or within a few seconds so that no player is ever out of sync in terms of what cards are being exposed to him.

The player must also be informed of the time slot for when to choose the card. The computer (i.e., game station computer N15), will automatically choose for the player should the player be unable to decide. The default is set at approximately three seconds. The default could be as much as five seconds, or less than three seconds.

The beauty of this MODIFIED POKER tournament is that the player is still playing the normal slot game while playing the tournament game. The house is getting maximum use of each machine because every player in the tournament must participate at maximum coinage, for example, five coins. Every round of the tournament is played at the 5 coin level. So the house is delighted because they are getting maximum use, and since each machine holds about 8% for the house, the house is making money. The player is happy because he is winning from the house and has the opportunity to win in the tournament. Essentially what is happening is that the tournament and the slot machine are totally separate entities that happen to be used at the same time.

In addition, in the same tournament, a player can be sitting at a nickel machine or a dollar machine. It does not matter. The player gets awarded from the money he puts into the machine at whatever unit/level the player is betting. But, the reward from the tournament is not based on the value of the points that are being played, but just the points themselves. For example, the player gets scored 3 units based on the pay-off table for having "3 of a kind" hand. The fact that the "3 of a kind" hand is worth $3 on his machine or 3 quarters on somebody else's machine, is irrelevant for the tournament, and vice versa, the tournament points are irrelevant to the slot machine aspect of the MODIFIED POKER game.

Next, every player then starts participating in the tournament. The game server computer N10 randomly chooses the hands and distributes them to all the game station computers N15 that are in the tournament so everybody is playing the exact same cards. It does not matter if you can see the next player's card. You are looking at the same cards on your screen. It does not matter what the other player chooses, unless that player is in first place and "you" are in second place. There is no way that the next round will be displayed until everybody has chosen a card for the present round.

Another interesting/advantageous feature is that a person can put up a $1000 for the tournament, and be sitting at a 10 cent slot machine. For example, a professional gambler might say:

"I like these odds. I'm playing against people who I think I'm better than. Luck has been eliminated and we're all playing the same cards. I like this. I'm in for a grand. I don't care about the pay-offs on the slot machine. It's a 10 cent machine, what do I care."

On the other hand, the casino can get even with the professional by saying you can only enter the tournament up to the level at which machine you are sitting at. So you are sitting at a 25 cent machine and you have to put up $25, you can't bet more than $25 in a tournament. That might force him to play a $1 machine or a $5 machine if he wants to bet $1000 for the tournament.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An electronic system for simultaneously playing a tournament game among a plurality of players playing against each other, and an individual game where the player plays against the house, comprising:

(a) a central computer, said central computer performing the following functions:
  (i) enabling all players to select a monetary level of wagering;
  (ii) assigning players to the tournament game;
  (iii) initiating and transmitting all events relating to the playing of the tournament to the player;
  (iv) tabulating, storing and transmitting data received from the plurality of players in response to the tournament game;
  (vi) evaluating each individual game within the tournament game to determine a winner for the tournament game; and
  (vii) distributing a tournament award; and (b) a plurality of player workstations, one player workstation for each player, each player workstation being electronically connected to said central computer, each player workstation performing the following functions:
  (i) electronically receiving and displaying tournament data from said central computer and from each player;
  (ii) transmitting player inputs for the tournament to said central computer;
  (iii) transmitting wagering data from the player to said central computer;
  (iv) processing the player inputs for the individual game and distributing an individual award responsive thereto.

2. An interactive electronic gambling casino system comprising:
(a) the electronic system playing a tournament among a plurality of players according to claim 1;
(b) means to display and initiate other casino functions and casino services from a menu that the electronic system provides the casino player; and
(c) means to display and initiate other casino wagering games from a menu the electronic system provides the casino player.

3. An interactive electronic gambling casino system according to claim 2, wherein one of the casino services is ordering drinks, and wherein information provided to the casino player in response to selection of the ordering drinks service is a menu display of available drinks.

4. An interactive electronic gambling casino system according to claim 3, further including means for input and transmittal of the casino player's drink request to an appropriate drink dispenser.

5. An interactive electronic gambling casino system according to claim 2, wherein one of the casino services is making reservations, and wherein information provided to the casino player in response to selection of the making reservations function is a menu display of possible reservations available.

6. An interactive electronic gambling casino system according to claim 5, further including means for input, transmittal, confirmation and crediting of the casino player's reservation request to the appropriate night club reservation system.

7. An interactive electronic gambling casino system according to claim 5, further including means for input, transmittal, confirmation and crediting of the casino player's reservation request to the appropriate restaurant reservation system.

8. An interactive electronic gambling casino system according to claim 5, further including means for input, transmittal, confirmation and crediting of casino player's reservation request to the appropriate hotel reservation system.

9. An interactive electronic gambling casino system according to claim 2, wherein one of the casino services is making travel/transportation arrangements, and wherein information provided to the casino player in response to selection of the making travel/transportation arrangements function is a menu display of possible travel/transportation arrangements available.

10. An interactive electronic gambling casino system according to claim 9, further including means for input, transmittal, confirmation and crediting of the casino player's travel/transportation arrangements with an appropriate travel agency system.

11. An interactive electronic gambling casino system according to claim 9, further including means for input, transmittal, confirmation and crediting of the casino player's travel/transportation arrangement with an appropriate bus transportation system.

12. An interactive electronic gambling casino system according to claim 9, further including means for input, transmittal and confirmation of the casino player's travel/transportation arrangements with an appropriate valet parking system.

13. An interactive electronic gambling casino system according to claim 2, wherein one of the casino services is to make credit/debit money transfers, and wherein information provided to the casino player in response to selection of the make money transfer function is a menu display of possible money transfers available.

14. An interactive electronic gambling casino system according to claim 13, further including means for input, transmittal, confirmation and crediting of money transfers with an appropriate credit/debit card service.

15. An interactive electronic gambling casino system according to claim 2, wherein one of the casino services is to take bets on sporting or racing events, and wherein the information provided to the casino player in response to selection of the betting on sports and racing function is a menu display of the sports and racing bets available or sports and racing results.

16. An interactive electronic gambling casino system according to claim 15, further including means for input, transmittal, confirmation and crediting of sports and racing bets.

17. An interactive electronic gambling casino system according to claim 15, further including means for transmittal, display and crediting of the results of the casino player's sports and racing bets.

18. An interactive electronic gambling casino system according to claim 15, further including means for transmittal and display of video images of key moments of the sports and racing events which the casino player placed the bet on.

19. An electronic system according to claim 1, wherein each of the individual games are scored based on a single unit bet column of a payoff table, and wherein each of the individual games are scored based on duplicate bridge match point scoring rules to determine the winner for the tournament game.

20. An electronic system according to claim 1, wherein each of the plurality of players optionally input different wagering data for playing the individual and tournament games.

21. An electronic system according to claim 20, wherein simultaneous tournaments are being played with players overlapping from one tournament to another responsive to the different wagering data.

22. An electronic system according to claim 20, wherein groups of simultaneous tournaments are formed responsive to the different wagering data, and wherein each of the groups is independently scored with respect to only those players within each of the groups.

23. An electronic system according to claim 22, wherein separate tournament rewards are providable for each of the simultaneous tournaments.

24. An electronic system according to claim 1, wherein the electronic system provides no restriction to the number of the players playing the tournament game.

25. An electronic system according to claim 1, wherein the tournament game includes players submitting different wagering data of different denominations.

26. An electronic system according to claim 1, wherein the tournament game includes players submitting different entry fees forming independently and substantially simultaneously scored player groupings.

27. An electronic system according to claim 1,
wherein said central controller comprises a master game server computer and a gamer server computer operatively connected thereto, and
wherein:
each of said workstations query said master game sever computer to participate in the tournament game,
said master game server computer assigns said workstation to said game server computer for a session start function,
said master game server computer terminates further participation and initiates a begin game function between all participating workstations and said game server computer, and
upon completion of the tournament game, said game server computer disconnects all the players participating in the tournament game.

28. An electronic system according to claim 1, wherein each of the plurality of players are transmitted the same events relating to the playing of the tournament.

29. An electronic system according to claim 28, wherein the same events comprise the same card indicia for playing of the tournament.

* * * * *